(12) United States Patent
Enis et al.

(10) Patent No.: US 7,755,212 B2
(45) Date of Patent: *Jul. 13, 2010

(54) METHOD AND APPARATUS FOR STORING AND TRANSPORTING ENERGY USING A PIPELINE

(76) Inventors: Ben M. Enis, 1231 Parioi Dr., Henderson, NV (US) 89052; Paul Lieberman, 19815 Mildred Ave., Torrance, CA (US) 90503

( * ) Notice: Subject to any disclaimer, the term of this patent is extended or adjusted under 35 U.S.C. 154(b) by 0 days.

This patent is subject to a terminal disclaimer.

(21) Appl. No.: 12/381,435

(22) Filed: Mar. 12, 2009

(65) Prior Publication Data
US 2009/0256362 A1   Oct. 15, 2009

Related U.S. Application Data

(63) Continuation of application No. 11/700,503, filed on Jan. 31, 2007, now Pat. No. 7,504,739, which is a continuation-in-part of application No. 11/407,733, filed on Apr. 20, 2006, now abandoned.

(60) Provisional application No. 60/763,577, filed on Jan. 31, 2006.

(51) Int. Cl.
*F03B 13/00* (2006.01)
(52) U.S. Cl. ........................................................ 290/54
(58) Field of Classification Search .................. 290/54, 290/55
See application file for complete search history.

(56) References Cited

U.S. PATENT DOCUMENTS

| 0,320,482 | A | 6/1885 | Laavitt |
| 0,943,000 | A | 12/1909 | Busby |
| 2,539,862 | A | 1/1951 | Rushing |
| 2,704,925 | A | 3/1955 | Wood |
| 3,120,109 | A | 2/1964 | Well |
| 3,178,900 | A | 4/1965 | Saunders |
| 3,251,192 | A | 5/1966 | Rich et al. |
| 3,314,881 | A | 4/1967 | Iuwiner |
| 3,356,591 | A | 12/1967 | Peterson |
| 3,367,123 | A | 2/1968 | Schambra |

(Continued)

FOREIGN PATENT DOCUMENTS

GB    2020375    11/1979

(Continued)

*Primary Examiner*—Joseph Waks
(74) *Attorney, Agent, or Firm*—J. John Shimazaki

(57) ABSTRACT

A method and apparatus for storing and transporting energy in the form of compressed air energy via a pipeline shown. The method preferably consists of using at least one power source to drive a compressor to compress air into storage, wherein the pipeline can be adapted to reduce the pressure losses that are experienced along its length, such as by providing first and second segments, wherein the second segment is located further downstream from the first segment, and the first segment's diameter is greater than that of the second segment. Facilities or communities connected to the pipeline can use the energy in the form of electricity, or to drive pneumatic tools or equipment, or to generate chilled air as a by-product, which can be used for refrigeration, air conditioning or desalination. A utility or grid or wind farm or other power source can be used to generate the compressed air energy, such as during low demand periods, such that the energy can be used during high demand periods.

23 Claims, 12 Drawing Sheets

U.S. PATENT DOCUMENTS

| | | |
|---|---|---|
| 3,443,393 A | 5/1969 | Coldberg |
| 3,501,924 A | 3/1970 | Ashley |
| 3,806,733 A | 4/1974 | Hasnen |
| 3,996,741 A | 12/1976 | Herberg |
| 4,049,648 A | 9/1977 | Bundy |
| 4,055,950 A | 11/1977 | Grossman |
| 4,118,637 A | 10/1978 | Tackett |
| 4,167,372 A | 9/1979 | Tackett |
| 4,228,661 A | 10/1980 | Maad et al. |
| 4,319,964 A | 3/1982 | Katz et al. |
| 4,323,424 A | 4/1982 | Secunda et al. |
| 4,334,411 A | 6/1982 | Payne |
| 4,356,015 A | 10/1982 | Oliver |
| 4,408,748 A | 10/1983 | Lewis |
| 4,455,834 A | 6/1984 | Earle |
| 4,829,196 A | 5/1989 | Bronicki et al. |
| 4,838,039 A | 6/1989 | Knodel |
| 4,849,648 A | 7/1989 | Longardner |
| 4,954,151 A | 9/1990 | Chang et al. |
| 5,206,537 A | 4/1993 | Alejandro et al. |
| 5,400,619 A | 3/1995 | Husseiny et al. |
| 5,707,928 A | 1/1998 | Baker |
| 5,924,283 A | 7/1999 | Burke, Jr. |
| 6,299,735 B1 | 10/2001 | Lumbreras |
| 6,305,189 B1 | 10/2001 | Menin |
| 6,321,539 B1 | 11/2001 | Bronicki et al. |
| 6,581,394 B1 | 6/2003 | Smolenskiy |
| 6,672,654 B2 | 1/2004 | Yamada et al. |
| 6,860,103 B2 | 3/2005 | Raghvachari |
| 6,863,474 B2 | 3/2005 | Webster et al. |
| 7,127,895 B2 | 10/2006 | Pinkerton et al. |

FOREIGN PATENT DOCUMENTS

| | | | |
|---|---|---|---|
| JP | 58117367 A | * | 7/1983 |
| JP | 2005180237 A | * | 7/2005 |
| RU | 2101562 C1 | * | 1/1998 |
| SU | 1163029 A | | 6/1986 |
| SU | 16661404 A2 | | 7/1991 |
| WO | WO 3004000869 A1 | | 1/2003 |

* cited by examiner

100-MILE LONG PIPE, 3-4 FEET INSIDE DIAMETER
THREE CONFIGURATIONS

PIPE UNDER WATER FROM OFFSHORE WIND TURBINE

ALONG THE DESERT FLOOR FROM MOUNTAIN-TOP WIND TURBINE

ALONGSIDE RAILROAD TRACKS FROM MOUNTAIN-TOP WIND TURBINE

PIPE

1. PNEUMATIC PIPE REPLACES ELECTRIC TRANSMISSION WIRES
2. PNEUMATIC PIPE REPLACES HIGH PRESSURE STORAGE TANKS

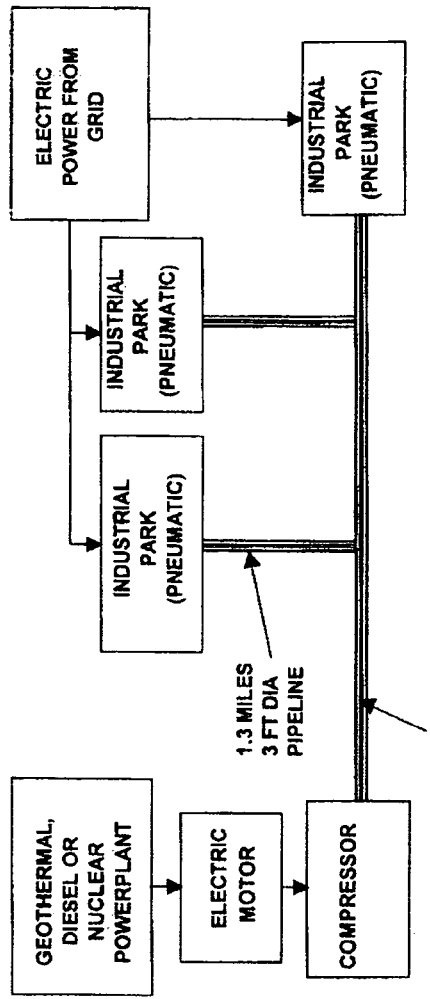
Figure 6a. Power Source Transfers Night Time Power to Daytime Power for Industrial Parks with Pneumatic Devices
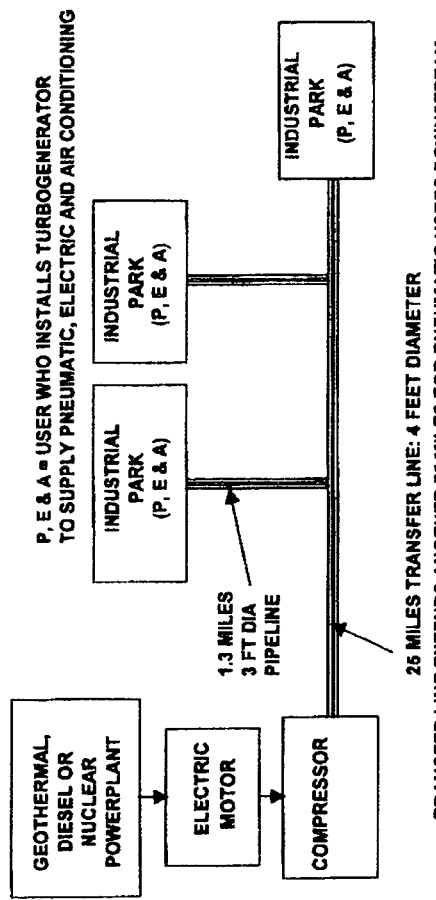
Figure 6b. Power Source Transfers Night Time Power to Daytime Power for Industrial Parks with Pneumatic, Electric and Air Conditioning Devices

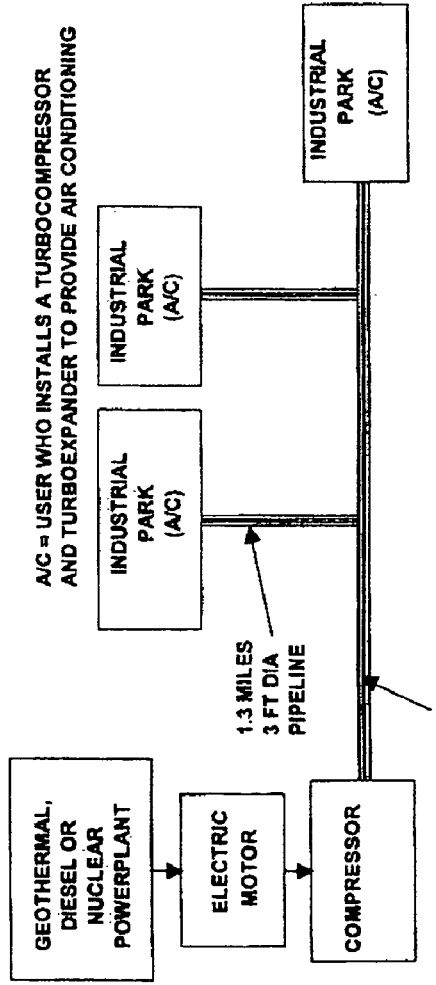
Figure 6c. Power Source Transfers Night Time Power to Daytime Power for Air Conditioner Users
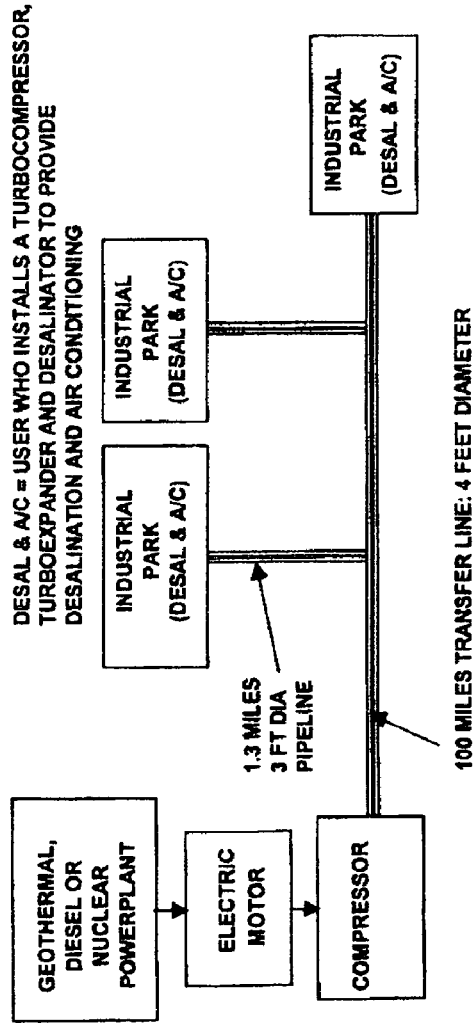
Figure 6d. Power Source Transfers Night Time Power to Daytime Power for Desalination and Air Conditioner Users

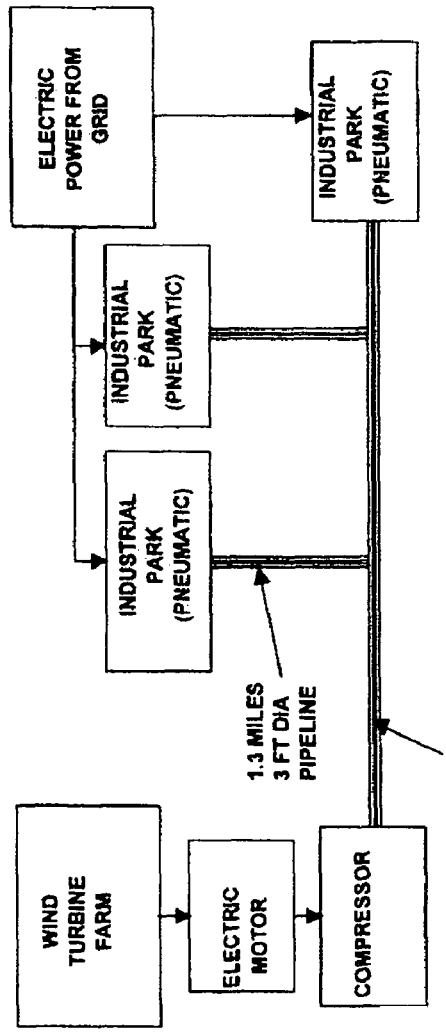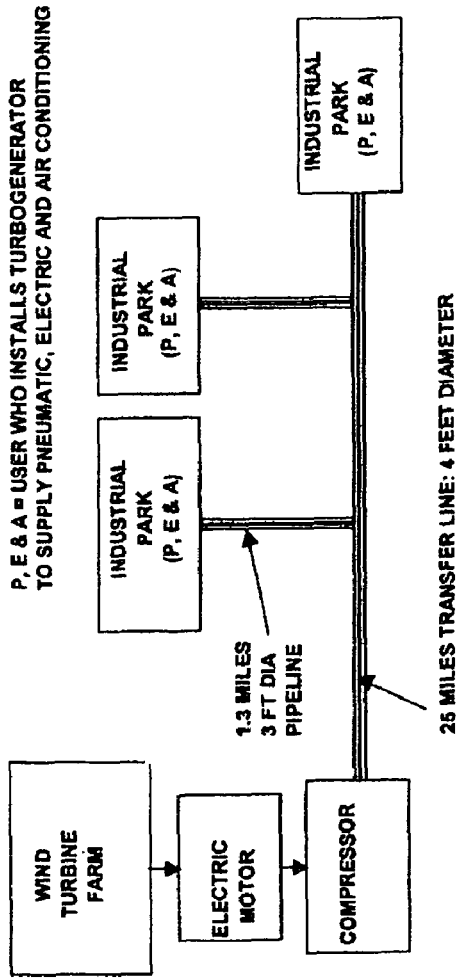
Figure 7a. Power History Smoothing for Pneumatic Device Users
Figure 7b. Power History Smoothing for Pneumatic, Electric and Air Conditioning Users

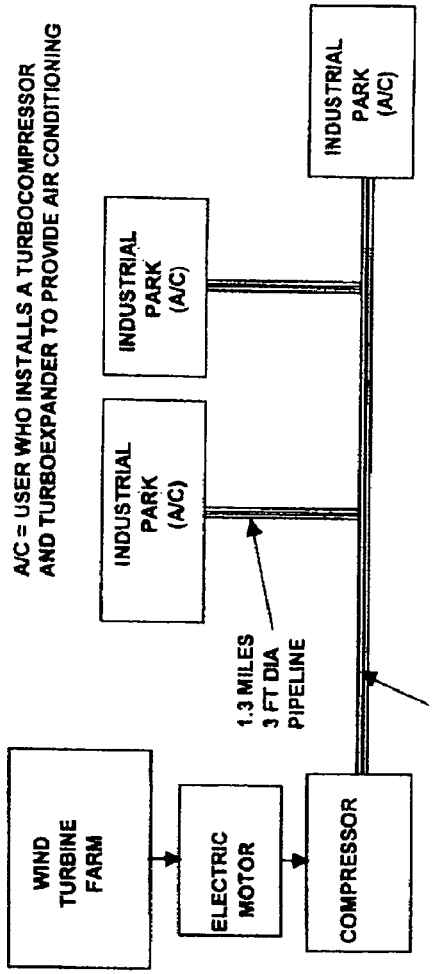
Figure 7c. Power History Smoothing for Air Conditioning Users
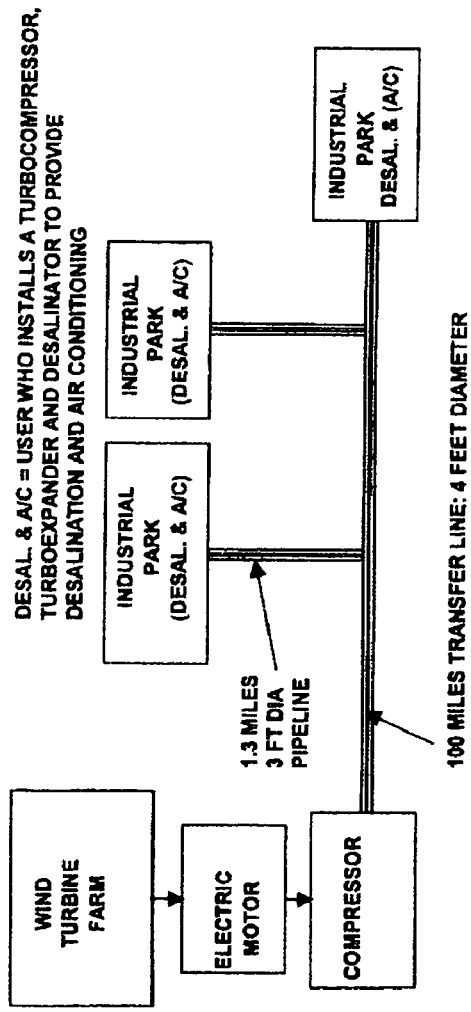
Figure 7d. Power History Smoothing for Desalination and Air Conditioning Users

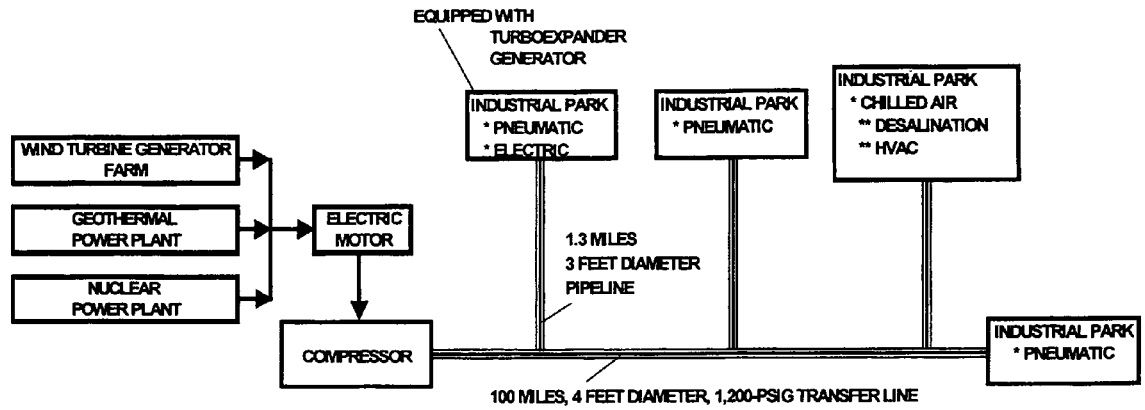
FIGURE 8. Schematic of transfer Line Compressed Air Energy Storage (TL-CAES) System
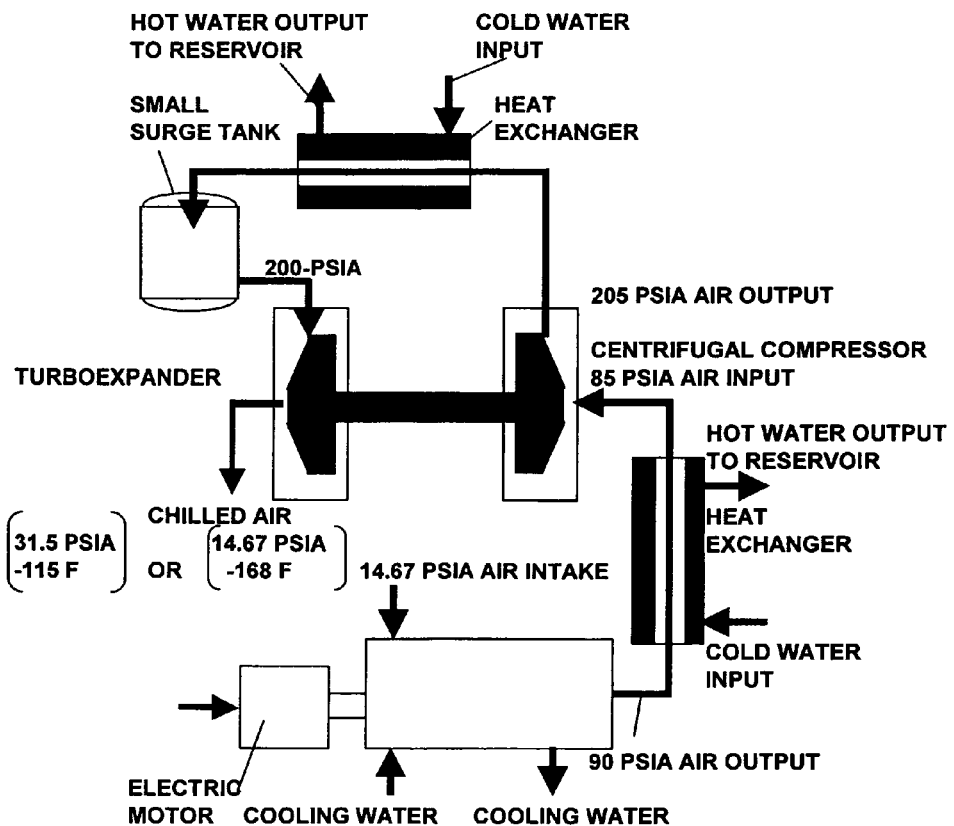
Figure 9. Chilled Air Generatewd by Turbocompressor and Turboexpander (Turbocompressor and Turboexpander Configuration

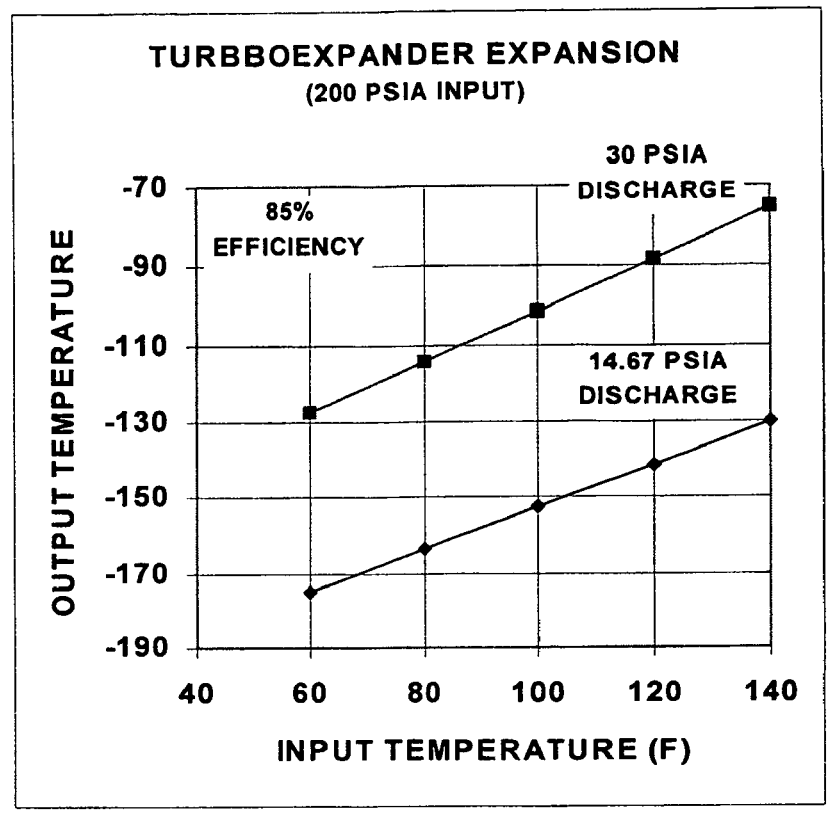
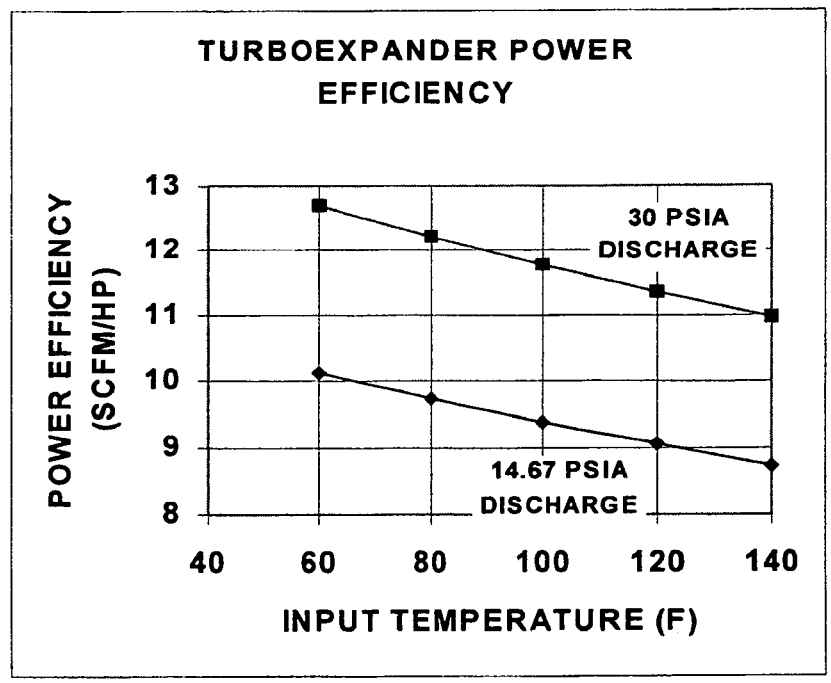
Figure 10 Turboexpander Performance with 85% Thermodynamic Efficiency

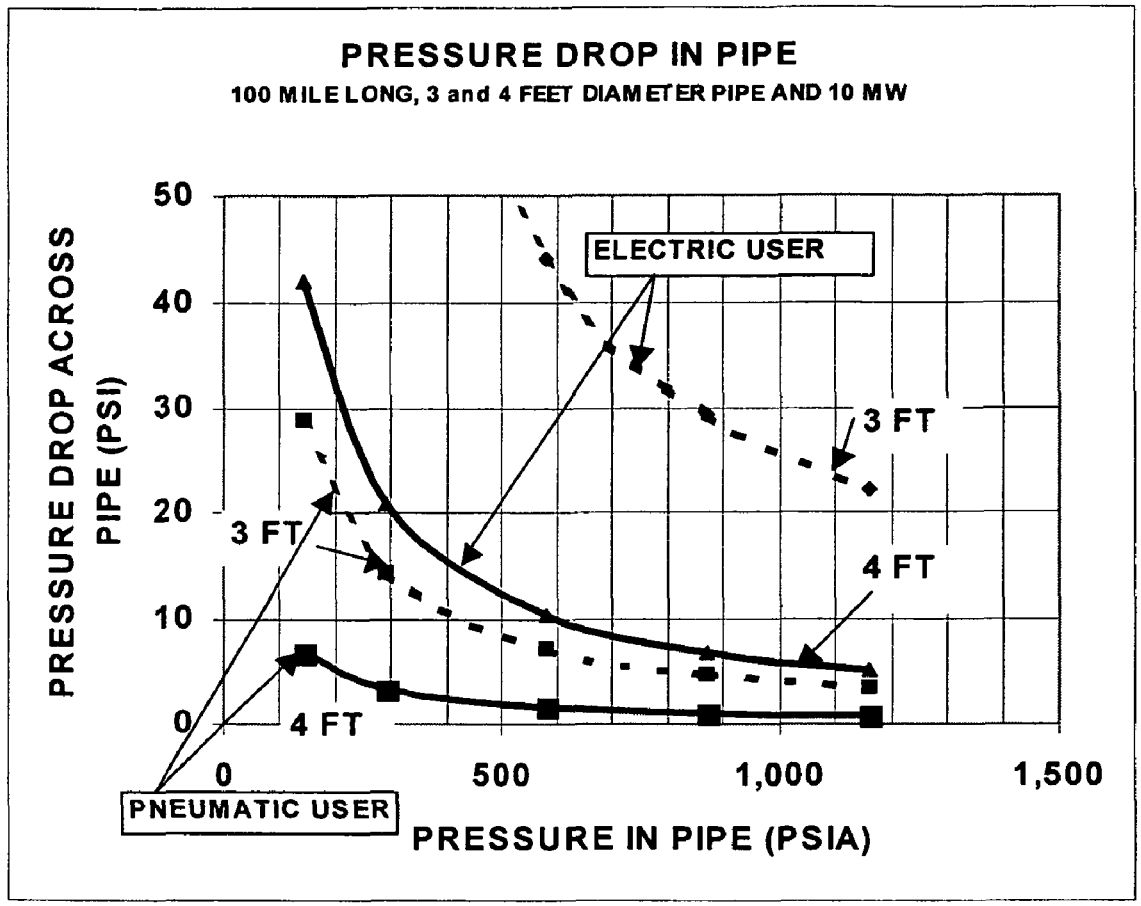
Figure 11. Pressure Drop in 100-Mile Long Pipe Line
Electric User Requires 9.9 SCFM/HP Compressed Airflow
Pneumatic User Requires 4 SCFM/HP Compressed Airflow

| Electrical | | Pneumatic | |
|---:|:---|---:|:---|
| 528,000 | FT LONG | 528,000 | FT LONG |
| 3 | FT DIA | 3 | FT DIA |
| 3,732,212 | CU FT | 3,732,212 | CU FT |
| 1214.67 | PSIA | 1214.67 | PSIA |
| 214.67 | PSIA | 214.67 | PSIA |
| 14.67 | PSIA | 14.67 | PSIA |
| 254,411,184 | SCF | 254,411,184 | SCF |
| 9.9 | SCFM/HP | 4 | SCFM/HP |
| 10,000 | KW | 10,000 | KW |
| 13,404.8 | HP | 13,404.8 | HP |
| 132,707.8 | SCFM | 53,619.3 | SCFM |
| 32.0 | HRS | 79.1 | HRS |
| 8 | HRS/DAY | 8 | HRS/DAY |
| 5.0 | DAYS/WEEK | 5.0 | DAYS/WEEK |
| 0.80 | WEEKS | 2.0 | WEEKS |
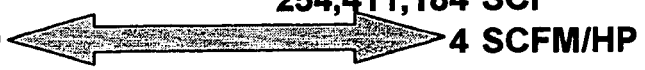
Figure 12 End User Uses Electricity or Pneumatic Power

METHOD AND APPARATUS FOR STORING AND TRANSPORTING ENERGY USING A PIPELINE

RELATED APPLICATIONS

This application is a continuation of U.S. application Ser. No. 11/700,503, filed on Jan. 31, 2007, now U.S. Pat. No. 7,504,739 which is a continuation in part of U.S. application Ser. No. 11/407,733, filed on Apr. 20, 2006, now abandoned which claims priority from U.S. Provisional Application Ser. No. 60/763,577, filed on Jan. 31, 2006.

FIELD OF THE INVENTION

The present invention relates to a method of transporting and storing wind generated energy, and in particular, to a method of transporting and storing wind energy in the form of compressed air, via a pipeline.

BACKGROUND OF THE INVENTION

Generating energy from natural sources, such as sun and wind, has been an important objective in this country over the last several decades. Reducing reliance on oil, such as from foreign sources, has become an important national issue. Energy experts fear that these resources, including oil, gas and coal, will someday run out. Because of these concerns, many projects have been initiated in an attempt to harness energy derived from what are often called natural "alternative" sources.

Wind farms, for example, have been built in areas where the wind naturally blows. In many areas, a large number of wind turbines are built and "aimed" toward the wind, wherein rotational power is created and used to drive generators, which in turn, generate electricity. Wind farms are most efficiently operated when wind conditions are relatively constant and predictable. Such conditions enable the supply and delivery of energy generated by the wind to be consistent, thereby avoiding surges and swings that can adversely affect the system. Failure to properly account for these conditions can result in power outages and failures, wherein a failure in one area of the grid could cause the entire system to fail, i.e., an entire regional blackout can occur.

The difficulty of operating wind farms, however, is that wind by its very nature is inconsistent and unpredictable. In many cases, wind speeds, frequencies, and durations vary considerably, i.e., the wind never blows at the same speed over a period of time, and wind speeds can vary significantly from one moment to another. And, because the amount of power generated by wind is mathematically a function of the cube of the wind speed, even the slightest fluctuation or oscillation in wind speed can result in a disproportionate change in wind-generated power.

These conditions can lead to problems. For example, in the context of a wind farm delivering energy to an electrical power grid, which is a giant network composed of a multitude of smaller networks, these sudden surges in one area can upset other areas and can even bring down the entire system in some cases. Also, if a wind farm is dedicated to providing energy to a community or facility, the same surges can cause overloads that can damage components connected to the system.

Another problem associated with wind fluctuations and oscillations relates to the peak power sensitivity of the transmission lines. When wind speed fluctuations are significant, and substantial wind power output fluctuations occur, the system must be designed with enough line capacity to withstand these occurrences. At the same time, if too much consideration is given to peak power outputs, the system could be over-designed, in which case, during normal operating conditions, the system may not operate efficiently, thereby increasing the cost of energy.

Another related problem is the temporary loss of wind power associated with an absence of wind or very low wind speed in some circumstances. When this occurs, there may be a gap in wind power supply, which can be detrimental to the overall grid power output. This is especially important during high demand periods, such as during periods when heating and cooling requirements are normally high.

Because of these problems, attempts have been made in the past to store energy produced by the wind so that wind generated energy can be used during peak demand periods, and/or periods when little or no wind is available. Utility companies and other providers of energy have, in the past, implemented certain time-shifting methods, wherein energy available during low demand periods is stored, and then used later during peak demand periods. These methods typically involve storing energy, and then using that energy later, to supplement the energy that is otherwise available.

Several such energy storage methods have been used in the past, including compressed air energy storage systems, such as underground caverns and tanks. Thus far, however, one of the main disadvantages of such systems is that they are relatively energy inefficient. For example, compressed air energy systems have a tendency to lose a significant portion of the stored energy when converting the compressed air energy to electrical energy, wherein the energy used from storage ends up costing more than the energy that was stored, i.e., just converting compressed air energy into electrical energy often results in a substantial loss of energy. These inefficiencies can make it so that the economic incentives required to install energy storage systems of this kind are significantly reduced. Past systems have not been able to reduce the inefficiencies, as well as the fluctuation and oscillation problems discussed above, inherent in using wind as an energy source.

Another problem associated with wind energy is that even if wind farms are located where the wind is more predictable and constant, and, even if storage facilities are constructed, there is the additional problem of getting the energy to where the energy is needed. In many cases, wind farms are located far from existing power grids, and far from communities and facilities where energy is needed, i.e., the ideal location for a wind farm may be on top of a hill, or mountain, or in a canyon, or the desert, or somewhere offshore, etc., which can be many miles from the site that needs the power. In such case, it would be extremely expensive to build power transmission lines to transmit electrical power generated by the wind farm, just to service the wind farm. Not only could there be significant costs associated with building storage tanks, i.e., to store energy as discussed above, but there would be an even greater cost associated with constructing new transmission lines that will have to extend great distances. Right-of-way costs will also be incurred, i.e., it is often necessary to obtain permission from local communities, wherein the process of obtaining approval can be time consuming and costly.

When conventional power transmission lines are involved, and used to transmit energy over long distances, there is the additional problem of line losses. This has become an increasing problem throughout the country. For example, despite the many thousands of miles of high voltage electric transmission lines that have been built over the last few decades, the rate of building new transmission lines has actually decreased, while the demand for electricity has continued to increase. In fact, according to some statistics, annual investment in new transmission facilities has declined over the last 25 years, wherein the result has been excess grid congestion, and bottlenecking, which has led to higher electricity costs, i.e., due to the inability of customers to access lower-cost electricity supplies, and because of higher line losses.

Line losses are often related to how heavily the system is loaded, and inherent to wiring properties and conditions used to transmit the energy. In fact, transmission and distribution losses were at about 5% in 1970, but have increased to about 9.5% in 2001, due to increased energy demand without an adequate increase in transmission facilities. These losses are caused by congested transmission paths that can affect various aspects of the grid, wherein it is estimated that power outages and quality disturbances have cost the economy up to $180 billion annually.

Another related problem is that throughout the country, the highest demand for energy often occurs during the day, and therefore, the demand for electrical energy during the most high-demand period continues to increase. These peak demands can place a heavy burden on utility plants and grids that supply electrical power, wherein they often have to be constructed to meet the highest demand periods, which means that during the low demand periods, they will inevitably operate inefficiently, i.e., at less than peak efficiency and performance. This means that not only must the transmission lines be built to withstand the highest demand periods, but the utility plants themselves must be designed to generate enough energy during the peak demand periods, even if those periods only occur during a small fraction of the time each month. This is because the transmission lines themselves do not store energy, i.e., they are merely energy "conduits," and therefore, the utility plants must be able to produce and supply the higher amounts of energy. Failure to properly account for such high demand periods, such as by over-designing the facilities to meet the peak demands, can result in the occurrence of frequent power outages and failures, and increased costs.

These demands can also place expensive burdens on customers that need to use energy during the peak demand periods, including many commercial and industrial property owners and operators. Utility companies often charge a significant premium on energy consumed during peak demand periods. This practice is generally based on the well known principles of supply and demand, e.g., energy costs are higher when demand is high, and less when demand is low. And because most commercial and industrial property owners are forced to operate during the day, they are most often forced to pay the highest energy costs during the highest demand periods.

Utility companies also charge for peak power usage during peak demand periods by assessing a penalty or surcharge (hereinafter "demand charge") on the maximum rate of consumption of power that occurs during a predetermined period, such as during a one month period. A demand charge may be assessed, for example, based on the maximum "peak" rate of consumption that occurs during a short spike or surge, wherein the demand charge can be assessed regardless of how short the "spike" or "surge" might be during that period, and regardless of what rate may apply immediately before and after the spike or surge. This demand charge can also be assessed regardless of the average consumption rate that may have been in effect during the period, which could be considerably lower than the peak. Even if the overall average rate of use is substantially lower, the demand charge can be based on a much higher spike or surge, experienced for a very short time during that period.

These pricing practices are designed to help utility companies offset and/or recover the high cost of constructing utility power plants and grids that are, as discussed above, designed to meet the peak demand periods. They also encourage commercial and industrial property owners and operators to reduce energy consumption during peak periods, as well as to try to find alternative sources of energy, if possible. Nevertheless, since most commercial and industrial property owners and operators must operate their businesses during the day, and alternative sources of energy are not always readily available, they often find themselves having to use energy from the grid during the highest rate periods. Moreover, because energy consumption rates can fluctuate, and surges and spikes can occur at various times, potentially huge demand charges may be applied.

SUMMARY OF THE INVENTION

Despite the many good intentions of energy producers across the country who have encouraged the use of alternative energy sources, the bottom line is that the cost of producing the energy must be such that it makes long term economic sense to construct the facilities needed to produce, supply and deliver energy to consumers.

In this respect, most populated areas of the country have adequate access to electrical power grids that supply energy produced by local utility companies, and are also willing to pay the cost of tapping into the existing grids. Except for those few instances where power outages might occur, most energy consumers have come to expect that they can simply connect to and obtain power from the nearest grid.

In some remote areas of the country, however, electrical power is not always readily available, and efforts must be made to supply needed power to those areas. For example, new electrical transmission lines, which are costly to install, may be required to enable facilities, and people who live and/or work in areas remote from the power grid, to receive access to electrical power. Nevertheless, the cost of constructing electrical transmission lines, from the site to the nearest power grid, can be prohibitively high. To make matters worse, these costs must often be incurred by end-users, such as when private non-governmental developments and facilities are involved. And, once the connection is made, they must continue to pay the utility to use the energy.

Nevertheless, due to the increasing cost of land, and the need to sell products that are competitively priced, many industrial facilities are seeking to locate their factories and other industrial complexes in remote locations, where the cost of owning and/or leasing land is still affordable, and where low priced skilled labor might still be available. While there are additional costs associated with constructing these types of facilities, including traveling to and from the location, in many cases, the decision to build and operate such facilities can make economic sense.

One problem associated with locating the facilities so far from the power grid, however, is the cost of connecting the facility to the power grid, to obtain the energy needed to operate the facility in an economical manner. In many cases, such as when a new factory is built, a new power transmission line must also be built, to connect to the grid, which, as discussed above, can be prohibitively costly. Due to the labor intensive nature of line installation, in many cases, the cost of installing a low capacity line can be almost as high as installing a medium to high capacity line. These costs can be a particular burden when the demand for energy at the facility is relatively small, i.e., compared to the capacity of the line, in which case, the power transmitted through the line may never reach its capacity.

These issues are compounded by the fact that the energy must still be purchased from the utility company that supplies energy to the grid. In such case, depending on how much energy is used by the facility, and when, i.e., during peak demand periods, the costs associated with using energy from the grid can be significant. As discussed above, the facility may be required to pay peak energy rates, which can occur when energy demand is at its highest, i.e., during the peak day-time hours. Additional demand charges, as discussed above, can also be incurred.

Energy losses attributed to connecting to the grid and extending the transmission line a long distance can also erode the efficiencies of the system and increase the cost of operation. Typically, while transmission lines are capable of transmitting large amounts of electrical energy, a significant amount of energy can be lost during the transmission, especially when great distances are involved.

In one aspect, the present invention relates to an improved method of storing wind generated energy in the form of compressed air, via a pipeline, at a remote location where wind energy is naturally available, and then transporting the compressed air energy, via the same pipeline, to a community or facility in need of the power, whether remote from the grid or not. It preferably comprises a series of compressors, and a relatively long pipeline, with one or more turbo expanders and/or generators servicing the community or facility, wherein the energy supplied by the pipeline can then either become the exclusive power source, or can supplement the power from the grid.

In a first configuration embodiment, the compressed air energy in the pipeline is used to drive a turbo expander, which is connected to a generator, such that electricity can be generated, which can be used by the end user community or facility. In addition, the waste chilled air by-product that is co-generated along with the electricity can be used for other purposes. For example, the waste chilled air from the turbo expander can be used for refrigeration and air conditioning purposes, at the community or facility, which is especially helpful when the system is located in warm climate areas. In such case, no additional heat source is provided, such that the system can take full advantage of the waste chilled air co-generated as the compressed air is released.

In this embodiment, not only is electricity generated, but the system preferably produces maximum chilled air, which can be used not only for refrigeration and air conditioning purposes, but also for desalination purposes. The desalination systems that are contemplated to be used in conjunction with the present invention are those that utilize chilled air to freeze water, which effectively helps to separate and remove contaminants found in water, thereby producing fresh drinking water. A thermal energy storage system can also be used to store the chilled water generated by the chilled air in a supplemental storage unit for later use. These embodiments are well suited for warm weather climates, such as in deserts, where access to fresh drinking water supplies is difficult.

In connection with this first embodiment, another version can be provided where only chilled air is produced, using a turbo expander specifically adapted to provide only cooling for the facility, i.e., no electricity is produced. This can be used, for example, where there is adequate energy available from the grid for the facility to operate, but the facility needs a low cost source to drive the air conditioning units.

In a second configuration embodiment, heating is provided on a limited basis to enhance the production of electricity. For example, in this embodiment, the preferred heat source is the waste heat generated by the compressors as the air is being compressed, which can be distributed back into the pipeline to heat the compressed air therein. In this embodiment, while a heating unit is used, an effort is made to eliminate the use of any additional energy source, which would require more power to operate. This embodiment also has the advantage of being able to generate, in addition to electrical power, a certain amount of chilled air as a by-product. Like the first embodiment, this embodiment preferably takes advantage of the chilled air co-generated by the turbo expander, i.e., as the compressed air is released, to provide chilled air for cooling purposes, except in this embodiment, the chilled air is not as cold, due to the added waste heat from the compressors.

In a third configuration embodiment, various heat sources, including waste heat from the compressors, and heater units, can be provided, as the compressed air is released, to maximize the generation of electricity by the generator, but at the expense of generating no chilled air. In this embodiment, it is contemplated that at least one of three different types of heating systems can be used as a means of providing heat to the compressed air, including 1) solar thermal collectors to utilize energy from the sun, including painting the pipeline black, and locating the pipeline in direct sunlight, such as on the desert floor, to make use of the sun's heat, 2) waste heat collectors to circulate the waste heat generated by the compressors to the compressed air stored in the pipeline, and 3) a separate heating unit, such as a fossil fuel burner, to introduce heat into the pipeline, or add heat to the turbo expander input as compressed air is being released by the turbo expander. The invention also contemplates using other methods of providing heat to the compressed air, such as combustors, etc., if desired.

In a fourth configuration embodiment, in addition to, or instead of, producing electrical energy, the system can be adapted to provide power in the form of compressed air energy, to drive pneumatic equipment, including tools and machinery, etc. In this respect, the pipeline can be adapted to provide energy to a facility that normally operates pneumatically driven equipment, wherein the compressed air energy in the pipeline can be used directly, without having to convert the compressed air energy into electricity first, thereby improving the efficiencies of the system. In this embodiment, the compressed air energy can be used to supplement the electrical energy available from the grid, i.e., the compressed air energy can be used to operate the pneumatic equipment, whereas, electricity from the grid can be used for other functions, in which case no electricity has to be produced from the compressed air energy. Alternatively, the system can have means to generate electricity from the compressed air energy, in addition to driving the pneumatic equipment, so that the facility would not need to be connected to the grid. In such case, the system can be adapted to switch between using the compressed air energy to generate electricity, on one hand, and driving the pneumatic equipment directly, on the other. They can also be simultaneously generated.

In a fifth configuration embodiment, in addition to, or instead of, incorporating a wind farm to produce the compressed air energy for the pipeline, the pipeline system can be connected to an existing power source, such as a utility, i.e., geothermal plant, nuclear power plant, hydroelectric plant, etc., or grid, wherein the system can be designed to compress air and store energy during low demand periods, such as at night, and use the stored energy during high demand periods, such as during the day. This way, the utility can continue to operate at its most efficient levels, and can store the energy that is produced at night when the demand is low, to supplement the energy that is needed during the high daytime demand periods.

From the standpoint of energy production, with this embodiment, the utilities are able to provide more energy during the high demand periods, without necessarily having to construct larger and higher capacity power generation facilities, which would be more costly to do. Also, the utility is able to produce energy at consistently high levels, throughout the day and night, to maximize the efficiency of the facility. Further, the utility is able to charge more for the energy used during the high demand periods, even though the energy is produced during the low demand, low cost, periods. From the standpoint of the user, the system can be developed so that the energy rates during the high demand periods are lower, and so that there are fewer surges, spikes and outages.

In a sixth configuration embodiment, one or more of the features described above in connection with the first five configuration embodiments can be incorporated into a single system, and can be used to provide energy to multiple communities and/or facilities along the length of the pipeline. For example, when the system is located in a hot desert, and services a facility using pneumatic equipment, the system can be installed without a heating element, so that the system can co-generate electricity and chilled air for air conditioning purposes at the same time. The system can also be set up to use the compressed air to drive the pneumatic equipment, thereby increasing the overall efficiencies. Likewise, the system can be adapted so that compressed air energy can be generated by both a wind farm and utility. Because of the uncertainties associated with using wind as a power source, it is often advantageous to provide a secondary source of energy, such as power from a utility or grid.

The present application incorporates by reference in its entirety previous U.S. patent application Ser. No. 10/263,848, filed on Oct. 4, 2002, which discusses methods and apparatuses for using wind turbines to generate and supply power, and previous U.S. application Ser. No. 11/242,378, filed on Oct. 3, 2005, and Ser. No. 10/865,865, filed on Jun. 14, 2004, which discuss different types of wind turbine systems to coordinate and stabilize power. The present application also incorporates by reference in its entirety previous U.S. patent application Ser. No. 10/857,009, filed Jun. 1, 2004, which discusses a method of storing and transporting wind generated energy using a pipeline, and previous U.S. provisional application Ser. No. 60/763,577, filed on Jan. 31, 2006, which discusses using compressed air energy in a pipeline system to operate pneumatic equipment, and previous U.S. provisional application Ser. No. 60/834,232, filed on Jul. 28, 2006, which discusses using compressed air energy in a pipeline system using power from a utility or grid. These methods and systems are preferably used in connection with the present invention to supply uninterrupted and stabilized power to the end user. These systems are preferably used in circumstances where wind farms are located far from the community or facility in need of the energy, wherein the energy can be stored as compressed air within a pipeline system extending from the wind farm to the community or facility.

One aspect of the present invention relates to the use of a pipeline system (either aboveground or underground) into which the compressed air from the wind turbines can be distributed, wherein the pipeline can be used to not only store the compressed air, but also transport the compressed air energy from one remote location (such as where wind conditions are ideal) to where the energy is needed (a facility or community in need of the power). Storage of compressed air in this manner allows the energy derived from the wind to be stored for a period of time until it is needed. The pipeline can also be used as a means of transporting the stored energy, such as from where the wind farm is located, to the location where the energy is needed, wherein the pipeline itself can serve as both storage and transport means.

A benefit to using this type of system is that the transmission means, which in this case is a pipeline, has the ability to not only transport energy from one location to another, but also to store energy. This way, unlike conventional power lines, which can only transmit power through a conduit, a predetermined amount of energy can be stored so that energy will be available, even if energy at the source becomes temporarily unavailable, i.e., the wind stops blowing, or the utility shuts down. It can also store energy produced during low demand periods, such as at night, so that it can be distributed and used during high demand periods, when the energy rates are higher. In such case, the system will be able to continue to supply energy to the end user for a predetermined amount of time, at a lower cost.

Another aspect of Applicant's invention takes into account the following: When determining the location of the wind farm, as well as where the pipeline is to be located, the method preferably takes into account existing roads, easements, underground pipes, railroad tracks, lines, cables, etc., and where they are located, so that the pipeline can be laid along the most economical and/or convenient path possible. That is, the pipeline is preferably located along a direct line or path extended along, or at least in close proximity to, existing roads, railroad tracks, easements, pipes, conduits, cables, etc., so that new roads, access, and open areas, etc., do not have to be built, and so that existing easements, land use permits, environmental impact reports, etc., can be used or relied upon to install the pipeline. In fact, where there are abandoned pipe systems, such as natural gas or sewer lines, the present invention contemplates connecting to, or using the existing pipes, in whole or in part, as well as their easements, access areas, roads, etc., to more economically install the pipeline system.

In one embodiment, the present invention contemplates constructing the pipeline so that it is adjacent or connected to an existing railroad track, by positioning and connecting the pipeline directly onto or adjacent the railroad ties. That is, the present invention contemplates taking advantage of the easements and network of railroad tracks that have been constructed throughout the country, which often extend to remote locations, to construct the pipeline at a reduced cost, and in a more efficient manner. The invention preferably comprises using connectors to connect the pipeline to the railroad ties themselves, such as above ground, with the pipeline extending parallel to the tracks, so that maintenance work can easily be performed on the pipeline, by traveling along the tracks. This way, the pipeline will not need to be buried in the ground, so as to reduce the cost of installation, and maintenance.

The present invention also contemplates constructing the pipeline along the desert floor, exposed to the hot sun, so that the pressure inside the pipeline can be advantageously increased due to the sun's heat. In this respect, it can be seen that there are advantages to locating the pipeline along an existing railroad track, which also extends through the desert, such that the sun can help increase the pressure inside the pipe, wherein additional energy can be generated when released.

In this respect, another synergistic effect contemplated by the present invention is locating the industrial facility in the desert, where chilled air created as compressed air energy is released can be used to supplement the air conditioning capabilities of the facility. This allows the facility to reduce its reliance on electrical energy, to power air conditioning units, thereby effectively increasing the overall efficiencies of the system.

BRIEF DESCRIPTION OF THE DRAWINGS

FIG. 6a shows a schematic drawing of an embodiment where a pipeline is used to service several industrial parks with pneumatic equipment, wherein the pipeline is 100 miles long, and 4 feet in inside diameter, and wherein energy is produced by a geothermal, diesel or nuclear power plant, and compressed air energy in the pipeline is stored at night, so that it can be used during the day;

FIG. 6b shows a schematic drawing of an embodiment where a pipeline is used to service several industrial parks with a combination of pneumatic equipment, and electrical and air conditioning needs, wherein the pipeline is 100 miles long, and 4 feet in inside diameter, with various energy sources, but wherein the farthest industrial park with electricity and air conditioning needs is only 25 miles away from the energy source, and wherein industrial parks with pneumatic equipment can be located as far as 100 miles away, based on the amount of energy losses attributable to the energy usage, as shown in FIG. 11. Note: In this case, the remaining 75 miles of pipeline can be smaller in size, such as 3 feet in inside diameter, if the pneumatic equipment demands from the industrial parks can be met, despite the greater pressure losses;

FIG. 6c shows a schematic drawing of an embodiment where a pipeline is used to service several industrial parks with air conditioning needs, wherein the pipeline is 100 miles long, and 4 feet in inside diameter, and wherein energy is produced by a geothermal, diesel or nuclear power plant, and compressed air energy in the pipeline is stored at night, so that it can be used during the day;

FIG. 6d shows a schematic drawing of an embodiment where a pipeline is used to service several industrial parks with desalination facilities and air conditioning needs, wherein the pipeline is 100 miles long, and 4 feet in inside diameter, and wherein energy is produced by a geothermal, diesel or nuclear power plant, and compressed air energy in the pipeline is stored at night, so that it can be used during the day, and wherein the end user installs the turbo compressor, turbo expander, and desalination system for their own industrial park;

FIG. 7a shows a schematic drawing of an embodiment where a pipeline is used to service several industrial parks with pneumatic equipment, wherein the pipeline is 100 miles long, and 4 feet in inside diameter, and wherein energy is produced by a wind farm and energy from the wind is stored in the pipeline;

FIG. 7b shows a schematic drawing of an embodiment where a pipeline is used to service several industrial parks with a combination of pneumatic equipment, and electricity and air conditioning needs, wherein the pipeline is 100 miles long, and 4 feet in inside diameter, and wherein energy is produced by a wind farm, but wherein the farthest industrial park with electricity and air conditioning needs is only 25 miles away from the wind farm, and wherein industrial parks with pneumatic equipment can be located as far as 100 miles away, based on the amount of energy losses attributable to energy usage, as shown in FIG. 11, and the end user can install the turbo generator to supply pneumatic, electric and air conditioning. Note: In this case, the remaining 75 miles of pipeline can be smaller in size, such as 3 feet in inside diameter, if the pneumatic equipment demands can be met, despite the greater pressure losses;

FIG. 7c shows a schematic drawing of an embodiment where a pipeline is used to service several industrial parks with air conditioning needs, wherein the pipeline is 100 miles long, and 4 feet in inside diameter, and wherein energy is produced by a wind farm and stored in the pipeline, and the end user can install the turbo compressor and turbo expander to provide air conditioning;

FIG. 7d shows a schematic drawing of an embodiment where a pipeline is used to service several industrial parks with desalination facilities and air conditioning needs, wherein the pipeline is 100 miles long, and 4 feet in inside diameter, and wherein energy is produced by a wind farm and stored in the pipeline, and wherein the end user installs the turbo compressor, turbo expander, and desalination system for their own industrial park;

FIG. 8 shows a schematic drawing of an example of a pipeline that is 100 miles long, is 4 feet in diameter, and has 1,200 psig pressure therein, with various energy sources attached, including a wind farm, geothermal and nuclear, and various end users, including an industrial park, with pneumatic equipment, and a desalination plant;

FIG. 9 shows a schematic drawing of a system having a turbo compressor and a turbo expander for generating chilled air;

FIG. 10 shows charts graphically indicating the level of turbo expander expansion and efficiency as air temperatures are increased;

FIG. 11 shows a chart graphically indicating the amount of pressure loss that can be experienced within the pipeline, as a function of the pipe diameter, the pressure inside the pipeline, and the manner in which the compressed air is used, i.e., either for generating electricity (where pressure and velocity is relatively high) or driving pneumatic equipment (where pressure is relatively low); and FIG. 12 shows a comparison between the electrical generation system and the pneumatic equipment driving system graphically displayed in FIG. 11, wherein a 100 mile pipeline, that is 3 feet in inside diameter, with about 1,200 psia pressure, is the exampled used to compare how long the pressure inside the pipeline will last between the two systems, when no additional pressure is added to the pipeline.

DETAILED DESCRIPTION OF THE INVENTION

Figure 1:
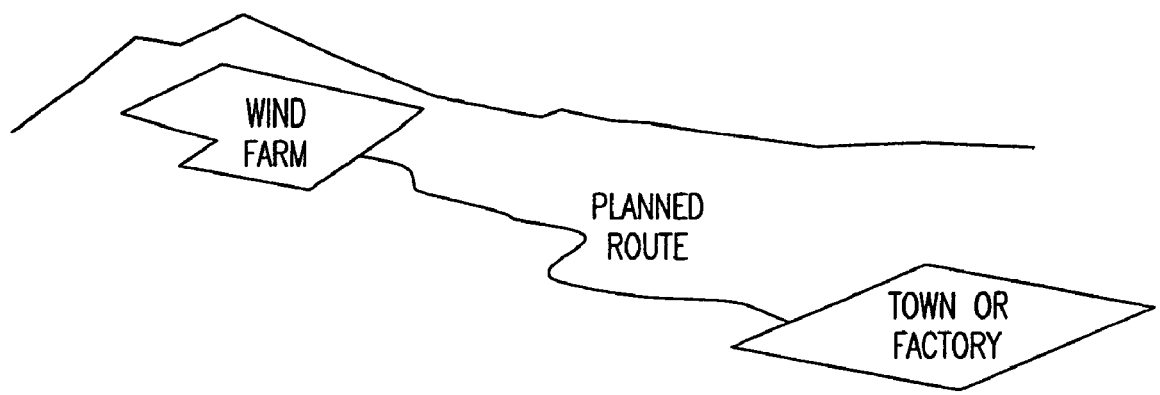
FIG. 1 shows a wind farm located in a remote location connected by a pipeline system extending along a planned route, such as along an existing road or easement, between the wind farm and end user, which can be a community, facility or grid, whereby compressed air energy from the wind farm can be stored and transported by the pipeline to the community, facility or grid.
Figure 2:
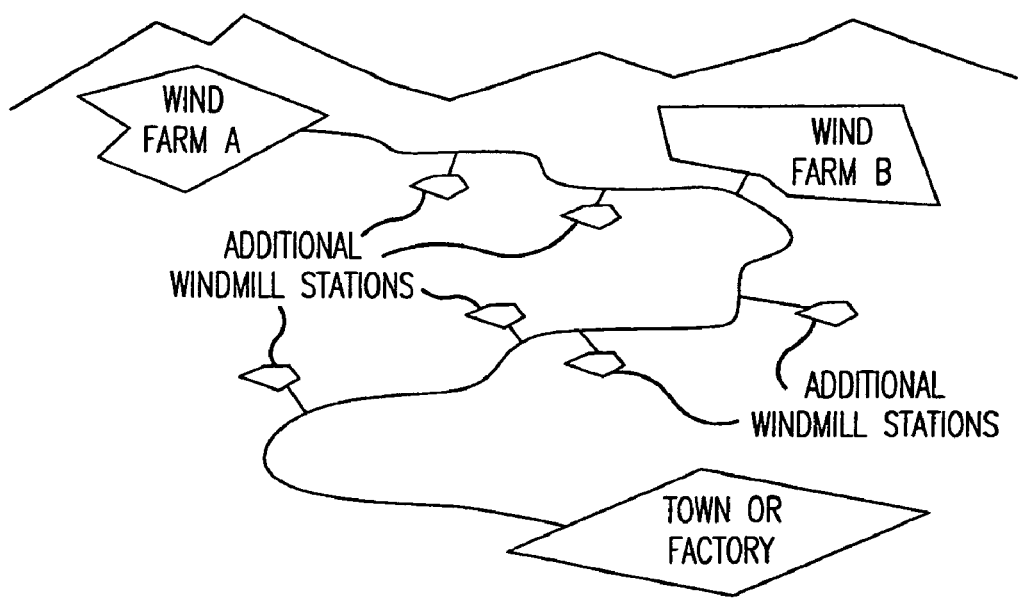
FIG. 2 shows two wind farms located in remote locations connected by a pipeline system extending along a planned route, such as along an existing road or easement, between the wind farms and end user, which can be a community, facility or grid, wherein additional windmill stations are provided along the planned route to provide intermittent sources of compressed air energy to maintain air pressure in the pipeline along the planned route.

One preferred aspect of the present invention relates to wind powered energy generating and storing systems capable of transporting wind generated energy from areas where wind conditions are ideal, to areas where energy is needed, as shown in FIGS. 1 and 2, without having to extend lengthy and expensive power transmission lines, and without having to build expensive compressed air storage tanks, etc. In this aspect, the present system preferably comprises selecting an area where the wind conditions are likely to be consistent and predictable, or at least more so than other areas that are available, which would be suitable for generating wind energy. By their very nature, these areas are often located in remote areas many miles from communities where people live, and far from existing power grids. They may, for example, be located in deserts, canyons, offshore areas, and on mountaintops or hilltops far from civilization. They are also often located where property values are relatively low.

Another preferred aspect of the present method encompasses making use of wind energy in preferred or ideal conditions, by locating one or more wind turbines in locations where wind conditions are ideally suited to generating a consistent and predictable amount of energy. Although all locations suffer from some unpredictability and uncertainty, there are clearly locations that are better than others, and the present method preferably takes into account the use of these preferred locations.

Figure 3:
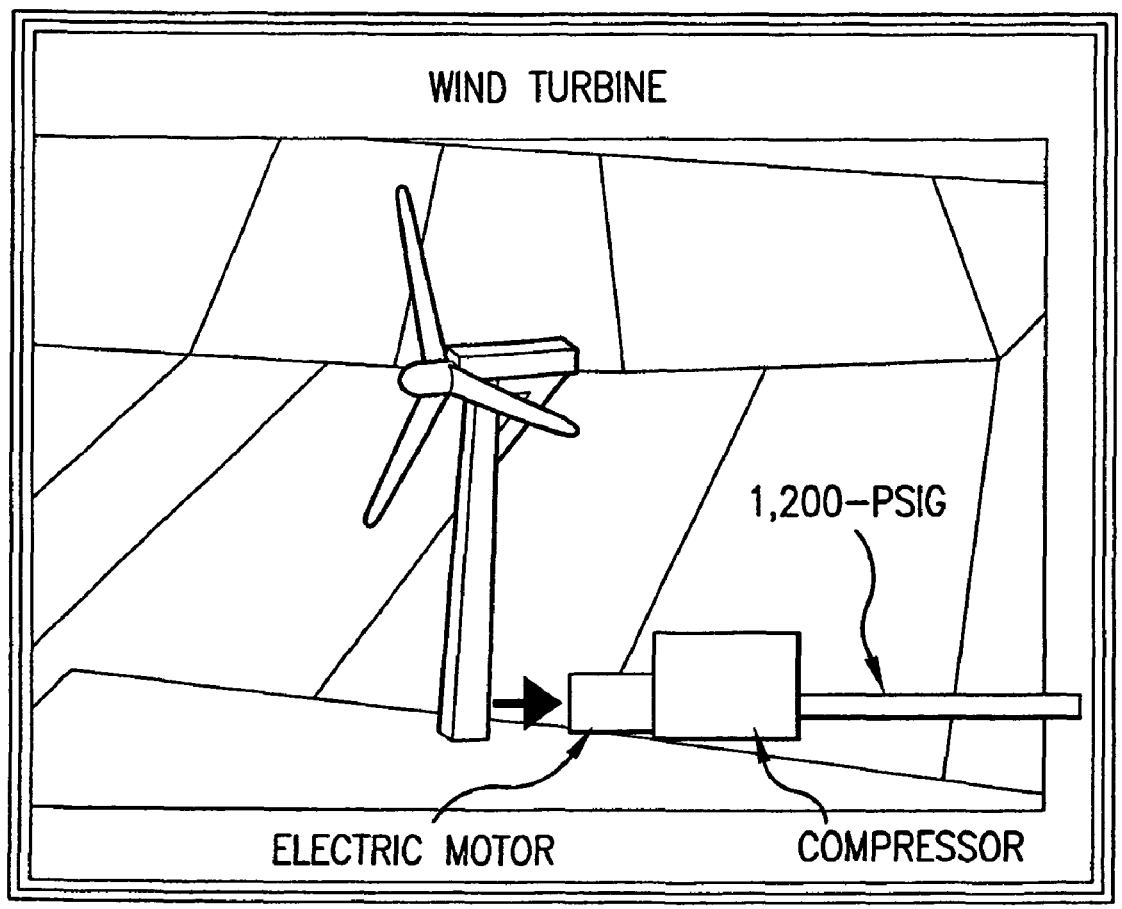
FIG. 3 shows a wind turbine with a schematic view of how energy is extracted from the wind turbine, via an electric motor, and generator, to drive a compressor which supplies compressed air energy into the pipeline system.

Another preferred aspect of the present invention relates to the use of at least one wind turbine, as shown in FIG. 3, that is either 1) dedicated to generating electricity to operate at least one compressor (hereinafter "electrical wind turbine"), or 2) dedicated to generating mechanical rotational energy to drive at least one compressor mechanically (hereinafter "mechanical wind turbine"). Each of the wind turbine types is preferably dedicated to generating compressed air energy that can be stored in the pipeline system. Preferably, the system is designed with a predetermined number of wind turbines, based on the amount of power needed by the end user facilities and communities, as well as a determination of the size and length of the pipeline that will be used, to service areas that are remote from the wind farm. Preferably, the system is both economical and energy efficient in generating the appropriate amount of energy.

Each electrical wind turbine type preferably has a horizontal axis wind turbine (HAWT) and an electrical generator located in the nacelle of the windmill, such that the rotational movement caused by the wind is directly converted to electrical energy via an electric motor and generator, as schematically shown in FIG. 3. This can be done, for example, by directly connecting the electrical generator to the horizontal rotational shaft of the wind turbine so that the mechanical power derived from the wind can directly drive the generator. The generator in turn can be used to drive a compressor, which generates compressed air energy, which can be stored in the pipeline.

The mechanical wind turbine type is somewhat more complex in terms of bringing the mechanical rotational energy from the high above-ground nacelle down to ground level as rotational mechanical energy. The horizontally oriented wind turbine of each station preferably has a horizontal shaft connected to a first gear box, which is connected to a vertical shaft extending down the wind turbine tower, which in turn, is connected to a second gear box connected to another horizontal shaft located on the ground. The lower horizontal shaft is then preferably connected to the compressor, such that the mechanical rotational power derived from the wind can be used to mechanically drive the compressor, which produces compressed air energy.

This mechanical energy can be used to drive the compressor directly, without having to convert the mechanical energy into electricity first. By locating the compressor downstream of the gearbox on the shaft, and by using the mechanical rotational energy of the wind turbine directly, energy losses typically attributed to other types of arrangements can be avoided. The power generated by each mechanical wind turbine can be used to directly power at least one compressor, which can be used to compress air energy into the pipeline system. Nevertheless, there are inherent problems associated with transmitting the wind power via a vertical shaft, which tends to vibrate due to resonance along the long shaft, wherein the vibrations need to be controlled for the system to function properly.

The compressed air energy generated by each wind turbine is preferably distributed into the pipeline, via one or more compressors. Storage of compressed air energy allows the energy derived from the wind to be stored for an extended period of time. By storing energy in this fashion, the compressed air can be released and expanded at the appropriate time, such as when little or no wind is available, and/or during peak demand periods. The released and expanded air can then be used to supply energy derived from the wind to generate electrical power on an "as needed" basis, i.e., when the power is actually needed, which may or may not coincide with when the wind actually blows.

Figure 5:
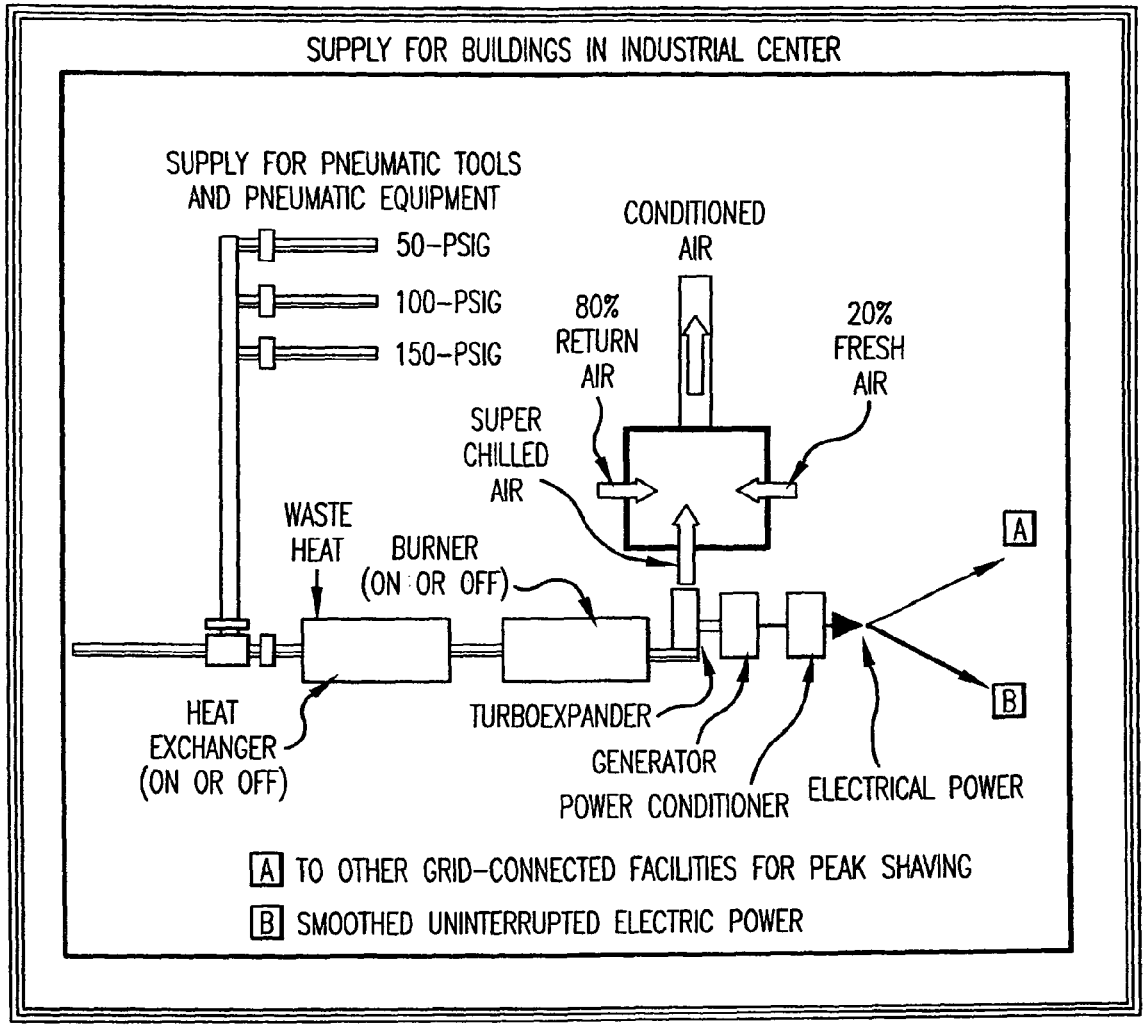
FIG. 5 shows a schematic drawing of a variable use system incorporating some of the features of the present invention, wherein the compressed air energy from storage can be used to supply energy directly to operate pneumatic equipment, generate electricity via a turbo expander, and provide chilled air co-generated as the electricity is produced, for cooling purposes, i.e., to operate air conditioning equipment, wherein waste heat and a burner unit are provided as optional means of heating the compressed air before being released by the turbo expander.

The present invention uses a pipeline system into which the compressed air from the wind turbines is preferably distributed and in which the compressed air energy can be stored and transported. Storage of compressed air energy allows the energy derived from the wind to be stored for a period of time until it is needed. The pipeline is also preferably used as a means of transporting the stored compressed air energy from the wind farm to the location where the energy is needed. The wind turbines and compressors are preferably located at one end of the pipeline, and turbo expanders, alternators and/or pneumatic equipment, etc., or other means of releasing and using the compressed air energy, are preferably located at the opposite end of the pipeline, as shown in FIG. 5, or along the length thereof.

It can be seen that the wind turbines discussed above can be used to produce compressed air energy directly for immediate delivery to the pipeline. It can also be seen that the compressed air energy can be stored in the pipeline to time shift the delivery of the energy, so that wind generated power can be made available at a remote location, even at times that are not coincident with when the wind actually blows, i.e., even when no wind is blowing, and/or during peak demand periods. The coordination and usage of these elements enables the current system to provide continuous and uninterrupted power to the end user in a stabilized manner, despite fluctuations and oscillations in wind speed, by coordinating and managing the delivery of energy to the facility or community in need of the power.

The wind patterns in particular locations change from time to time, i.e., from one season to another, from one month to another, and, most importantly, from day to day, hour to hour, and minute to minute. These fluctuations and oscillations are dealt with in conjunction with energy storage, by storing energy when it is most available, and then using the energy when it is most needed, such that the system can provide continuous output at a substantially constant rate, at a reduced cost to the utility. In this respect, the present invention contemplates operating a wind farm that uses high wind periods to cover low wind periods, and to smooth out the delivery of wind power. The long transmission pipeline permits the feed of a constant power output level to the end users during the daytime, thereby permitting the utility to charge more for power produced at night, at a lower cost.

The system contemplates being able to monitor the amount of compressed air energy inside the pipeline at any given time—it preferably measures the amount of pressure being compressed into storage, and the amount being released at any given time, and the total amount of pressure inside. This way, the system can keep an adequate amount of pressure inside the pipeline, by controlling how much energy is supplied into the pipeline, and how much is being released. The controls are necessary to maintain proper pressure. levels in the pipeline, in an effort to make sure that the system never runs out of compressed air energy, wherein the pressure is preferably maintained at a level of at least 200 psia.

The pipeline can be buried in the ground or located above ground and extended between the wind turbine, and the communities and/or facilities where the energy is needed, which can be a distance of many miles. By storing energy in this fashion, the compressed air is preferably stored in and transported through the pipeline system along a planned route, as shown in FIGS. 1 and 2, wherein the stored compressed air energy can be released at the opposite end of the pipeline, or along the length of the pipeline, to generate power for the associated facilities and communities. Thus the wind turbines and compressors are preferably located at one end of the pipeline, and a means of releasing the compressed air so that it can be used is preferably located at the opposite end of the pipeline, or along the length of the pipeline.

This is vastly different from a standard transmission line which merely transmits energy, i.e., when the energy source is no longer able to provide power, no power will be available through the line. A benefit to using the present system is that the transmission means, i.e., the pipeline, has the ability to store energy. This way, unlike conventional power lines, which can only transmit power, a predetermined amount of energy can be stored, so that energy will be available, even if the energy source becomes temporarily unavailable, i.e., the wind stops blowing. In such case, the system will be able to continue to supply energy for a predetermined amount of time despite the lack of wind.

Another preferred aspect of the invention comprises using a planned route in connection with installing the pipeline system to transport wind energy from a remote location where wind conditions are ideal to a location where energy is needed. A planned route is essentially a direct line or path extending from the energy source to the end user, i.e., facility or community. For example, in many cases, such a path preferably extends along or near an existing road, such as a service access road, that allows the pipeline to be installed along an already-cleared path, which also provides easier access to the wind farm. This also allows for easier installation of the pipeline, as well as easier access for repairs and service.

The selected path could also be routed along an existing easement, such as along an existing underground conduit, such as an electrical or gas line, sewer pipes, etc., which can reduce the cost of installation. This is because it may be possible to use and/or rely upon the existing easements, land use permits, right of ways, environmental impact reports, etc., that were obtained to install the existing lines, which will allow the pipeline to be installed faster and at a lower cost.

In cases where there is an abandoned existing underground pipe system, such as a gas or sewer line, the present invention contemplates being able to use the abandoned pipe, in whole or in part, to help form the new pipeline system, and reduce the cost thereof. In this respect, if the existing pipeline is not the correct size, or does not extend the entire length, or is not entirely abandoned, the present invention contemplates using at least a portion of the existing pipe, i.e., whatever portion can be utilized. The new pipeline can also be positioned adjacent to the existing pipeline, if necessary. All of the easements, land use permits and environmental impact reports that were obtained for the existing pipeline can be used and/or relied upon for the new pipeline system.

Figure 4:
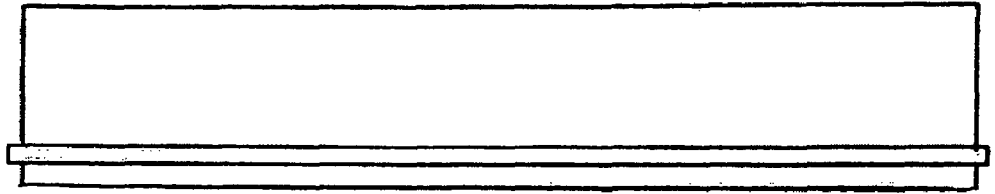
FIG. 4 shows several pipeline embodiments, including a pipeline system located underwater, along the desert floor, and adjacent a railroad track (and connected to the railroad ties), and mentions a preferred length of pipe, i.e., 100 miles long, and preferred pipe size (3 to 4 feet in inside diameter)
Figure 4:
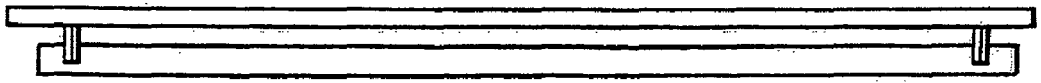
Figure 4:
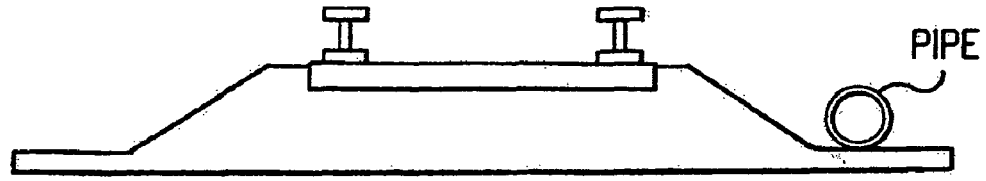

In one embodiment, as schematically shown in FIG. 4, the present invention contemplates constructing the pipeline so that it is adjacent or connected to an existing railroad track, by positioning and connecting the pipeline directly onto or adjacent the railroad ties. The present invention contemplates taking advantage of the easements and network of railroad tracks that have been constructed throughout the country, which often extend to remote locations from existing communities, to construct the pipeline at a reduced cost, and in a more efficient manner. The invention preferably comprises using connectors to connect the pipeline to the railroad ties themselves, with the pipeline extending parallel to the tracks, so that maintenance work can easily be performed on the pipeline, by traveling along the tracks. This way, the pipeline will not need to be buried in the ground, so as to reduce the cost of installation, and maintenance. The invention also contemplates that intermittently along the pipeline, certain exit points can be provided, wherein compressed air can be released to operate equipment, such as those that might be needed to repair the railroad track.

In another embodiment, also schematically shown in FIG. 4, the present invention contemplates constructing the pipeline along the desert floor, exposed to the hot sun, so that the pressure inside the pipeline can be advantageously increased due to the heat. The exterior can be painted black, or other dark color, to enhance energy absorption. The thermal inertia of the wall thickness of the pipeline can provide a useful means of absorbing heat which can be used to increase pressure inside the pipeline, and prevent the system from freezing during expansion. In this respect, it can be seen that there are advantages to locating the pipeline along the desert floor, such that the hot sun can help increase the pressure inside the pipe, wherein additional energy can be generated when released. The present invention contemplates that the pipeline, and/or related components, and their masses, can be designed to absorb and release heat to maintain the stored compressed air at a relatively stable temperature.

In certain cases, the total energy losses attributable to using a pipeline to store and transport compressed air energy is less than the energy losses attributable to transmitting electricity through standard transmission lines, i.e., for the same distances. Accordingly, the present invention contemplates building a wind turbine, or wind farm, and instead of using standard transmission lines, using a pipeline to store and transport compressed air energy, wherein the losses inherent in using conventional transmission lines can be reduced. An analysis of the present invention indicates that within certain distances, and circumstances, the percentage of energy losses experienced along the length of the pipeline can be less than the percentage of losses attributed to standard transmission lines, and, in the case of the present invention, it has been found that the larger the pipeline, the greater the reduction in energy losses that can be experienced.

The present invention preferably takes into account the total percentage of energy losses attributable to using a pipeline to store and transport compressed air energy, which has been found to be a function of several different factors, including the diameter of the pipeline, the pressure inside the pipeline, and the manner in which the compressed air is used, i.e., whether the compressed air is used to generate electricity, or whether it is used to drive pneumatic equipment or provide cooling for an HVAC unit. The determination of the appropriate amount of energy storage capacity needed to operate the system efficiently preferably takes into account the desire to maintain a reduced percentage of energy losses along the length of pipe, which preferably takes into account the friction that can occur as compressed air is released, as well as the other factors discussed herein.

One of the disadvantages of building a remotely located wind farm to transmit electrical energy has been the cost of constructing the electrical transmission lines, and, its associated problems, including energy losses experienced along the length of the line. The invention contemplates determining the appropriate amount of energy storage capacity needed to operate the system efficiently, and then appropriating the proper amount of storage space within the pipeline to accommodate the expected loads. As mentioned, it has been found that the percentage rate of energy losses attributable to the pipeline can be reduced by increasing the diameter of the pipeline.

In this respect, as shown in FIG. 11, it has been found that when larger size pipes, with greater volume, are used, the percentage of energy losses along the length of pipe, due to friction, can be reduced, i.e., the overall percentage of energy loss can be reduced by using a larger pipe. For example, according to FIG. 11, when a 100 mile long pipeline that is 3 feet in inside diameter is filled to about 200 psia, a pressure drop of more than 20 psia can be expected by the time the compressed air is released to drive the pneumatic equipment. On the other hand, when the same length pipeline is 4 feet in diameter, and is filled to the same pressure, i.e., 200 psia, and is used for the same purpose, the pressure drop that can be expected is less than 10 psia. It can also be seen that when a 100 mile long pipeline that is 3 feet in diameter is filled to about 600 psia, when used to generate electricity, a pressure drop of more than 60 psia can be expected by the time the compressed air is released at the opposite end of the pipeline. On the other hand, when the same length pipeline is 4 feet in diameter, and is filled to the same pressure, i.e., 600 psia, and is used for the same purpose, the pressure drop that can be expected is less than 10 psia. Accordingly, it can be seen that the amount of pressure loss experienced along the length of the pipeline is at least partly a function of pipe diameter.

It has also been determined that there are greater pressure losses associated with the use of turbo expanders to produce electricity, which require relatively high pressure, and greater air velocity, than associated with using the compressed air to drive pneumatic equipment, which doesn't require as much pressure or velocity to operate, i.e., they only need between 30 to 150 psig, on the average. For example, according to FIG. 11, it can be seen that if the 3 feet diameter pipe is filled to 200 psia, and is used to generate electricity, the pressure losses attributable to friction will be significant, i.e., the line representing that loss is off the charts, making it unsuited for that particular use. On the other hand, it can be seen that if the same 3 feet diameter pipe is filled to the same 200 psia, but is used to drive pneumatic equipment, the pressure losses attributable to friction will only be a little over 20 psia, which is certainly manageable. This difference is primarily due to the fact that greater air velocity is needed, i.e., at least 200 psia (and preferably more), to generate electricity using a turbo expander, than is needed to drive pneumatic equipment, i.e., only between 30 to 150 psia is needed. Accordingly, the amount of pressure drop in the pipeline is also a function of the type of energy usage, i.e., whether for generating electricity or driving pneumatic equipment.

It has also been determined that there are greater pressure losses when there is less pressure inside the pipeline at any given moment in time. For example, according to FIG. 11, it can be seen that if the 3 feet diameter pipe is filled to a pressure of 200 psia, and is used to drive pneumatic equipment, the pressure losses attributable to friction will be a little over 20 psia. On the other hand, it can be seen that if the same 3 feet diameter pipe has a pressure of 1,200 psia, for the same purpose, the pressure losses attributable to friction will be less than 5 psia. This difference is primarily due to the fact that overall pressure can affect how friction through the pipeline can be overcome. The more pressure there is in the pipeline, the more easily the friction can be overcome, whereas, the less pressure there is in the pipeline, the more difficult it is for the friction to be overcome. Accordingly, the amount of pressure drop in the pipeline is also a function of air pressure in the pipe.

Accordingly, it is desirable to provide a pipeline system having adequate size and length, to maintain reasonable pressure levels and energy loss levels for the type of application the pipeline is being used for. The goal is to provide a pipeline size and length that will enable the system to run efficiently, with reduced energy losses along the length of the pipe, for all of the various applications and end uses it is being designed for. For example, a determination is preferably made to determine the approximate amount of storage volume or space that is to be used by the system, followed by determining the length of the pipeline that will be laid, as well as the distance to and nature of the end user, and then determining the size (diameter) of the pipe needed to provide the appropriate amount of storage space for the system. Additional calculations such as determining the power capacity levels to be supplied by the energy source, as well as pressure levels to be maintained in the pipeline, and expected pressure losses, can also be determined. This way, the entire pipeline system can be designed for the specific loads that are expected to exist, without any further need for building additional pipelines, or any extra storage tanks, which can increase the cost thereof. This is unlike Tackett, U.S. Pat. No. 4,118,637, which shows a grid or network of pipes for storing energy, and specifies the largest possible commercially available pipe-size.

One variation of the pipeline that can be provided is to locate end users that require production of electricity closer to the energy source, as shown in FIGS. 6b and 7b. In such case, it may be desirable to locate those users that need to generate electricity closer to the source, so that less pressure loss will be experienced along the length of the pipeline, by the time the compressed air is released by the turbo expander. Because pressure loss is a function of pipe diameter, type of energy usage, and amount of pressure, the pipeline itself can be designed so that, for example, the first 25 miles of pipeline is 4 feet in diameter, to accommodate the higher pressures needed by the electricity users, and the remaining 75 miles of pipeline can be smaller, i.e., such as 3 feet in diameter, which should be sufficient to drive pneumatic equipment.

Even when using a consistent size pipe, i.e., 4 feet in inside diameter, when multiple end users are tapped into the pipeline along the length of the pipeline, and the total length is considerable, i.e., 100 miles, it may be desirable to locate the end users (that want to use turbo expanders to generate electricity) closer to the energy source, i.e., within 25 miles of the source, rather than further down along the length of the pipeline. This is especially important if the pipeline diameter is only 3 feet, instead of 4 feet, because, as shown in FIG. 11, the pressure losses that can be experienced within the pipeline when the pressure begins to drop can be significant.

And, in the case of using an energy source operated only during certain times of the day, i.e., a utility that stores energy only during the nighttime, or a wind farm that only stores energy when the wind blows, there are likely to be lull periods where no additional compressed air energy is being added to the pipeline. Accordingly, there are likely to be times when the pressure inside the pipeline can get fairly low, in which case, the pressure losses can become significant. For the above reasons, when a pipeline that is 3 feet in diameter or less is used, it is desirable to locate the end users that want to generate electricity using a turbo expander within 25 miles of the energy source, whereas, when a 4 feet diameter pipeline is used, the end user wanting to generate electricity can be located further away, since, even when pressure within the pipeline drops to below 600 psia, the pressure losses will not be as significant.

Notwithstanding the above, one preferred aspect of the present invention is that the pipeline should be adapted so that additional end users can be tapped into the pipeline when the need arises in the future, i.e., as needs expand, as shown in FIG. 8. That is, the pipeline should be pre-designed to accommodate multiple end users, then existing, as well as foreseeable future end users, with various requirements, whether they need electricity, or air conditioning, or to drive pneumatic equipment. In this respect, it should be worth noting that the system should be designed with the expectation that the needs will be expanded in the future, so one way to accommodate this expansion is to use a pipeline that is at least 4 feet in diameter, if possible.

The amount of pressure in the pipe is preferably within the range of about 200 to 1,200 psig, wherein it is desirable to maintain the pressure at or above 600 psig, if possible, especially if the end user desires to use a turbo expander to generate electricity. When the end user only needs to use the compressed air for air conditioning or to drive pneumatic equipment, the pressure can be lower, i.e., under 200 psia, although preferably, there is always at least 200 psia in the pipeline.

The pressure losses should also be taken into account when determining how long the compressed air energy, i.e., pressure within the pipeline, will last, before additional pressure will need to be added. This will determine the extent to which a greater capacity energy source, whether more wind turbines, or increased power capacity of the utility, will be needed. It can also determine whether a larger diameter pipe, and/or a longer or shorter pipeline, should be used, and what type and location of end user should be allowed to tap into the pipeline to achieve optimum results.

As shown in FIG. 12, in the case of a source providing 10 MW of power, such as a wind farm, using a 3 feet diameter pipeline, that is 100 miles long, and begins with a pressure of 1,200 psia, it has been found that the pipeline can provide up to about 32 hours of electrical power before more pressure would need to be added to the pipeline. This means that if there is only one end user, the air in the pipeline might last a maximum 32 hours, but if there are four end users, it might only last 8 hours. In this example, there is a total of 320 MW—hours of energy stored within the pipeline. There may also be additional volume stored in the local branches.

An important point to make here is that as the pressure begins to drop, due to energy usage, and there is no additional energy being added back in, the pressure losses begin to become more significant, which is also more critical when the pipeline is smaller in diameter. When the pipeline is larger, i.e., 4 feet in diameter or more, there is not only more volume of compressed air inside the pipeline, and therefore, more energy in the pipeline, but the air in the pipeline will also experience a reduced amount of friction and pressure loss, as the compressed air is used, as discussed above.

The present invention also contemplates using additional wind turbine stations with compressors or other means of intermittently supplying additional pressure into the pipeline along the pipeline route, as shown in FIG. 2. Preferably, to reduce cost, these wind turbines can have less capacity than the main wind turbines. For example, the main wind turbines at the wind farm may have a total 10 MW rating, but the supporting wind turbines might have a 2 MW rating. This way, additional pressure can be introduced into the pipeline, to reduce pressure losses, and provide a stable source of compressed air energy, that can be used continuously by the end user facilities and communities. Additional wind turbines or wind farms, such as those located in other remote locations, which are connected to the pipeline, can also be used, as shown in FIG. 2, to provide additional compressed air energy into the system.

The present invention contemplates several different configurations for the use of the compressed air energy stored in the pipeline, as shown in FIGS. 6a, 6b, 6c, 6d, 7a, 7b, 7c and 7d. Not only can multiple end users be connected to the pipeline, to draw compressed air energy out, but each one can be located along the length of the pipeline, at various places along the pipeline, and can have different uses and applications. So long as the pipeline is sized and adapted to store a sufficient amount of compressed air energy to accommodate the number, type and nature of the end users tapping into the pipeline, and the amount of pressure, and losses attributable to each end user, are taken into account, there is no limit to the number and variety of end users that can be serviced by the pipeline.

FIG. 6a shows an embodiment where a pipeline is used to service several industrial parks outfitted with pneumatic equipment, wherein the pipeline is 100 miles long, and 4 feet in inside diameter. In this example, the energy is produced by a geothermal, diesel or nuclear power plant, and an electric motor is used to power a compressor, which generates compressed air energy. Also, in this embodiment, the compressed air is preferably stored in the pipeline at night, so that it can be used during the day, to make more efficient use of the energy supplied by the source. The local branch pipelines can be 3 feet in diameter, since each one only services a single industrial park.

FIG. 6b shows an embodiment where a pipeline is used to service several industrial parks, each having a combination of pneumatic equipment, and the need for electricity and air conditioning, wherein the pipeline is 100 miles long, and 4 feet in inside diameter. Again, in this embodiment, the energy is produced by a geothermal, diesel or nuclear power plant, and compressed air energy in the pipeline is stored at night, so that it can be used during the day. But in this embodiment, the industrial parks that have electricity and air conditioning needs are preferably located a maximum of only about 25 miles away from the energy source, so that the greater air pressure requirements to service the turbo expanders can be satisfied. At the same time, the industrial parks that only need compressed air to drive pneumatic equipment can be located further away, such as 100 miles away, since pneumatic equipment requires less pressure and velocity to operate. The decision to locate the end user in this manner is based on the amount of pressure and energy losses attributable to the energy usage, as shown in FIG. 11. In this case, the remaining 75 miles of pipeline can be 3 feet in inside diameter, if desired, if the pneumatic equipment demands of the end users down stream can be met, despite the greater pressure losses. The local branch pipelines can be 3 feet in diameter, since each one only services a single industrial park. The end user can install the turbo generator to supply pneumatic, electric and air conditioning.

In another version, when more power is needed at the source, i.e., 40,000 kW of power, rather than, say, 10,000 kW of transmitted power, it may be desirable, in view of the pressure losses that can occur along the length of the pipeline, to use a shorter pipeline, and increase the pipe size. For example, instead of using a 100 mile pipeline that is 4 feet in inside diameter, it may be more efficient to reduce the length of the pipeline down to, say, 20 miles, and use two 4 feet diameter pipes, so that more energy can be stored, and more energy can reach the end user without incurring too much energy loss. The resultant system preferably consists of two 4-feet diameter pipelines that are 20 miles long that can transmit 40,000 kW. This conclusion is based on how revenue is generated based upon power usage, and the need to recoup the cost of constructing the system, and the increased pressure losses that can occur in the pipeline when trying to transmit more compressed air energy at higher velocities to meet higher power demand. Note that this 20 mile system can be connected in series to meet a 100 mile system if there are other power sources along the route that could add energy to the pipeline along the way. Several booster stations can be provided along the way to make up the pressure loss that can occur due to friction within the pipeline.

FIG. 6c shows an embodiment where a pipeline is used to service several industrial parks with air conditioning needs, wherein the pipeline is 100 miles long, and 4 feet in inside diameter. Again, in this embodiment, the energy is produced by a geothermal, diesel or nuclear power plant, and compressed air energy in the pipeline is stored at night, so that it can be used during the day. The end user can install the turbo compressor and turbo expander to provide air conditioning. The local branch pipelines can be 3 feet in diameter, since each one only services a single industrial park.

FIG. 6d shows an embodiment where a pipeline is used to service several industrial parks with desalination facilities and air conditioning needs, wherein the pipeline is 100 miles long, and 4 feet in inside diameter. Again, in this embodiment, the energy is produced by a geothermal, diesel or nuclear power plant, and compressed air energy in the pipeline is stored at night, so that it can be used during the day. In this embodiment, the end user can install the turbo compressor, turbo expander, and desalination system for its own industrial park. The local branch pipelines can be 3 feet in diameter, since each one only services a single industrial park.

FIG. 7a shows an embodiment where a pipeline is used to service several industrial parks outfitted with pneumatic equipment, wherein the pipeline is 100 miles long, and 4 feet in inside diameter. In this embodiment, the energy is produced by a wind farm and energy from the wind is converted by a generator to drive an electric motor, which in turn, drives a compressor. The compressor then stores compressed air energy in the pipeline. The local branch pipelines can be 3 feet in diameter, since each one only services a single industrial park.

FIG. 7b shows an embodiment where a pipeline is used to service several industrial parks, each having a combination of pneumatic equipment, and the need for electricity and air conditioning, wherein the pipeline is 100 miles long, and 4 feet in inside diameter. Again, in this embodiment, the energy is produced by a wind farm, and energy from the wind is converted by a generator to drive an electric motor, which in turn, drives a compressor. The compressor then stores compressed air energy in the pipeline. But in this embodiment, the industrial parks that have electricity and air conditioning needs are preferably located a maximum of only about 25 miles away from the wind farm, so that the greater air pressure requirements to service the turbo expanders can be satisfied. At the same time, the industrial parks that only need compressed air to drive pneumatic equipment can be located further away, such as 100 miles away, since pneumatic equipment requires less pressure and velocity to operate. The decision to locate the end user in this manner is based on the amount of pressure and energy losses attributable to the energy usage, as shown in FIG. 11. In this case, the remaining 75 miles of pipeline can be smaller, such as 3 feet in inside diameter, if the pneumatic equipment demands of the end users down stream can be met, despite the greater pressure losses. The local branch pipelines can be 3 feet in diameter, since each one only services a single industrial park. The end user can install the turbo generator to supply pneumatic, electric and air conditioning.

FIG. 7c shows an embodiment where a pipeline is used to service several industrial parks with air conditioning needs, wherein the pipeline is 100 miles long, and 4 feet in inside diameter. Again, in this embodiment, the energy is produced by a wind farm, and energy from the wind is converted by a generator to drive an electric motor, which in turn, drives a compressor. The compressor then stores compressed air energy in the pipeline. The end user can install the turbo compressor and turbo expander to provide air conditioning. The local branch pipelines can be 3 feet in diameter, since each one only services a single industrial park.

FIG. 7d shows an embodiment where a pipeline is used to service several industrial parks with desalination facilities and air conditioning needs, wherein the pipeline is 100 miles long, and 4 feet in inside diameter. Again, in this embodiment, the energy is produced by a wind farm, and energy from the wind is converted by a generator to drive an electric motor, which in turn, drives a compressor. The compressor then stores compressed air energy in the pipeline. The end user installs the turbo compressor, turbo expander, and desalination system for its own industrial park. The local branch pipelines can be 3 feet in diameter, since each one only services a single industrial park.

Various embodiments with different configurations are contemplated.

1. The First Configuration:

In one embodiment, the present invention uses the waste chilled air by-product generated as electricity is being produced by releasing compressed air energy with the turbo expander to operate an HVAC unit for air conditioning, or for refrigeration, or both. Means for releasing the compressed air, such as turbo expanders, to enable the compressed air to be released and expanded are preferably provided. This way, the stored compressed air energy in the pipeline can be used to drive an electric generator, to generate electrical power on an "as needed" basis. And while releasing the compressed air energy generates electricity, the system can co-generate chilled air, which is a waste by-product of releasing the compressed air.

The chilled air can be re-cycled and used directly, i.e., in the form of chilled air, which can be mixed with the ambient air, or fed into an HVAC unit, to keep the end user facilities cool. While the input air in the pipeline begins at an ambient temperature of about 70 degrees F., the resultant chilled air produced as a by-product of producing electricity can be as cold as minus 170 degrees F. or more. Moreover, at the same time, the system preferably converts compressed air energy into electricity, which can be used for lighting, heating, cooling, and other conventional utilities. For example, if electricity is needed at the end user facility, a turbo expander and generator can be connected to the pipeline, such that the compressed air can be released to generate electrical energy, and to co-generate chilled air, wherein the total efficiency of the facility can be improved. This way, the entire system can be constructed and used in a manner that makes the facility more efficient to operate, than would be the case using standard electrical systems alone.

In this respect, in this embodiment, preferably, no heat source is provided, or if it is, it should be turned off, as shown in FIG. 5, so that greater chilled air is produced, which allows the system to take full advantage of the waste chilled air generated as the compressed air is released. In this embodiment, not only is electricity generated, but the system preferably produces maximum chilled air, which can be used not only for refrigeration and air conditioning purposes, but also for desalination.

The desalination systems that are contemplated to be used in conjunction with the present invention are those that utilize chilled air to freeze water, which effectively helps separate the contaminants found in seawater and other brackish water from the water, thereby producing fresh drinking water. In areas where fresh drinking water is scarce, the chilled air being generated by releasing the compressed air can be used to desalinate water, such as described in applicant's previous application Ser. Nos. 60/789,415, 60/794,190, and 60/832,777, which are incorporated herein by reference. The chilled air can be fed into a freeze crystallization chamber, where seawater is sprayed, to produce ice, and therefore, desalinate water. A thermal energy storage system, as described in applicant's previous application, Ser. No. 11/585,023, entitled THERMAL ENERGY STORAGE SYSTEM USING COMPRESSED AIR ENERGY AND/OR CHILLED WATER FROM DESALINATION PROCESSES, which is incorporated herein by reference, can also be used to store the chilled water generated by the chilled air in a supplemental storage unit for later use. These embodiments are especially suited for warm weather climates, such as in deserts, where access to fresh drinking water may be difficult to achieve.

Another version of this embodiment can be adapted to provide only chilled air, and no electricity, by using a turbo expander that releases the compressed air energy to generate chilled air to cool the facility. This situation can occur when a facility is already connected to the power grid, and can obtain electrical power from the grid, i.e., for its other functions, but wants a low cost way to provide cooling for the facility. In such case, the facility can purchase its own turbo expander, and connect a branch pipeline to the main pipeline, and tap into the compressed air energy, to generate chilled air.

A possible configuration for this version is shown in FIG. 9, wherein a turbo compressor uses the compressed air from the pipeline to pressurize a surge tank, which helps to smooth out the deliver of power. Then, as the turbo compressor rotates because of the input pressure, it causes the turbo expander to rotate. The surge tank continues to pressurize and the turbo expander continues to accelerate until there is a steady-state pressure inside the surge tank that is higher than the input pressure. Accordingly, there is a continuous conversion of the input air, to create an output air, which is at a reduced temperature, and ambient pressure. For example, the input pressure can be 90 psia, which can be increased to 200 psia in the surge tank, and the resultant output temperature can be in the order of minus 70 to minus 170 degrees F., with the output pressure being 14.67 psia (0 psig).

In a variation of the embodiment, the utility can pay for the pipeline and the individual end users can pay for the equipment to extract and use the compressed air energy stored in the pipeline, such as turbo expanders, HVAC units, desalination systems, etc. In such case, the utility can install the pipeline and achieve payback on the investment in a reasonable time, and the end user can purchase its own equipment that would have its own payback period.

2. The Second Configuration:

In a second embodiment, heating is preferably provided on a limited basis. For example, in this embodiment, only an existing heat source is preferably used, such as the waste heat generated by the compressors as the air is compressed, which can be stored in the pipeline. Additional heat from the sun, by locating the pipeline above ground, on the desert floor, can also be used. This way, there is a higher efficiency of delivery of electrical power, even though at the expense of less chilled air. In this embodiment, however, an effort is made to eliminate using any additional energy source to provide heat, which would require its own power source to operate.

This embodiment has the advantage of being able to generate, in addition to electrical power, a certain amount of chilled air. This embodiment preferably takes advantage of the chilled air being generated by the turbo expander, i.e., as the compressed air is released, to provide chilled air for cooling purposes. For example, the waste chilled air from the turbo expander can be used for refrigeration and air conditioning purposes, which is especially helpful when the community or facility that the pipeline services is located in a warm climate. When the waste heat is used, the system contemplates being able to heat the compressed air in the pipeline from normal ambient temperature of about 70 degrees F., as in the first embodiment, to a temperature of about 250 degrees F., wherein the chilled air that is co-generated can then be increased in temperature to about minus 75 degrees F.

3. The Third Configuration:

In a third embodiment, the system is advantageously provided with several heaters to enhance the generation of electricity from the compressed air. For example, waste heat from the compressors, or other heat sources, can be provided, as the compressed air is released, to maximize the generation of electricity thereby. For example, this embodiment contemplates using at least one of three different types of heating systems, including 1) solar thermal collectors that utilize energy from the sun, including locating the pipeline above ground, to make efficient use of the sun's heat, 2) waste heat collectors to circulate the waste heat generated by the compressor to the compressed air in the pipeline, and 3) a separate heating unit, such as a fossil fuel burner, to introduce heat into the pipeline, or add heat to the turbo expander input as compressed air is being released by the turbo expander. The invention also contemplates using other standard methods of providing heat to the compressed air, such as combustors, etc., if desired. When these heaters are used, the system contemplates being able to heat the compressed air from the 250 degrees F. achieved by the waste heat alone, to about 490 degrees F., wherein the resultant air delivered after the compressed air is released can be a comfortable plus 70 degrees F. With this embodiment, there is an even higher efficiency delivery of electrical power, but at the complete expense of no chilled air.

The increased temperature provides several advantages. First, it has been found that heat contributes greatly to the efficiency of overall work performed by the turbo expanders, and therefore, by increasing the temperature of the compressed air, a greater amount of energy can be generated from the same size storage volume. Second, by increasing the temperature of the air, the pressure can be increased, wherein a greater velocity can be generated through the turbo expander. Third, heating the air helps to avoid freezing that can otherwise be caused by the expansion of the air by the turbo expander. Without any heat source, the temperature of the air being released can reach near cryogenic levels, wherein water vapor and carbon dioxide gas can freeze and reduce the efficiency of the system. This embodiment is preferably able to maintain the temperature of the expanding air at an acceptable level, to help maintain the operating efficiency of the system. According to FIG. 10, when using a turbo expander, it can be seen that the greater the input temperature, the greater the output temperature, whereas power efficiency decreases.

4. The Fourth Configuration:

In a fourth embodiment, the compressed air is delivered by the pipeline to an industrial park, or other industrial facility, and the compressed air is used directly at the park or facility, to operate pneumatic equipment. This can be done, either in addition to, or instead of, producing electrical energy, and co-generating chilled air. When the facility is not hooked up to the grid, the facility can be adapted to produce electricity with the turbo expander and use the compressed air to drive pneumatic equipment at the same time, thereby enhancing the efficiency and economics of the system, and alleviating excess loads on the grid. The turbo expander can also be used to produce chilled air as a by-product, in which case, it can be used for air conditioning and other cooling purposes. In most cases, an industrial facility will require both pneumatic power and electrical power, i.e., pneumatic power to operate its heavy equipment and tools, and electricity for other functions. Chilled air can also be used as a bi-product of releasing the air. On the other hand, when the facility is hooked up to the grid, the facility can be adapted to draw only pneumatic power. In such case, the compressed air energy can be used to supplement the electrical energy already available at the site.

To take maximum advantage of the pneumatic power supplied to a given facility, the facility that uses the compressed air energy should be one that normally uses pneumatically driven equipment in its daily operations. When compressed air is utilized to operate pneumatic equipment, without having to convert the compressed air energy into electricity first, the efficiencies of the system are improved. While there may be a certain amount of power loss that occurs over the length of the pipeline, i.e., due to friction as discussed above, since the compressed air is used without having to convert the energy into electricity first, there are no other losses associated with converting compressed air energy into electrical energy. Thus, the inefficiencies associated with the conversion of pneumatic power to electric power can be eliminated.

In this aspect, the present invention relates to an improved method of storing energy in the form of compressed air, via a pipeline, and then transporting the compressed air, via the same pipeline, to a facility that operates pneumatically driven equipment, such that the compressed air can be utilized to operate the equipment without having to convert the compressed air energy into electricity first. Unlike past wind farms, and past compressed air systems, which require compressed air energy to be converted into electricity first, the present invention can utilize a pipeline system for storing the compressed air energy, and transporting it to a location where it can be used, without having to convert the compressed air energy into electricity first.

There are also significant operational and economic advantages to using pneumatic systems. For example, pneumatic tools have less friction, so they tend to last longer than conventional mechanical tools. Also, when they are kept clean and lubricated, they can be almost indestructible. They have very few moving parts, and they normally run cool. Some of the pneumatic equipment contemplated by the present invention include the following: Blow guns; nail guns; air staplers; air sanders; spray guns; sandblasters; caulking guns; air ratchet wrenches; air hammers; air chisels; air drills; impact wrenches; die grinders; cut off tools; tire buffers; air reciprocating saws; air nibblers; air flange tools; air screwdrivers; air shears; air polishers, etc. A series of control valves that produce varying degrees of pressure, such as 50 psig, 100 psig, and 150 psig, to drive the pneumatic equipment, can be provided.

5. The Fifth Configuration:

In a fifth embodiment, a utility plant, such as conventional fuel combustion-driven turbine generators, geothermal, nuclear, hydroelectric, etc., or a grid, can be connected to the pipeline, in addition to, or instead of, incorporating a wind farm to produce the energy. In this respect, consider that a nuclear power plant is desirably located far enough away from population centers for safety reasons, i.e., in case of a potential radioactive cloud release, and therefore, using the pipeline of the present invention can be helpful in being able to locate the utility far enough away from the community or facility in need of the power.

In this embodiment, the pipeline system can be connected to an existing power source, such as a utility or grid, wherein the system can be designed to compress air and store energy during low demand periods, such as at night, and use the stored energy during high demand periods, such as during the day. This way, the utility can continue to operate at its most efficient levels, and can store the energy that is produced when the demand is low, to supplement the energy that is needed during the high demand periods. This not only helps to reduce the cost of energy, from the standpoint of energy production, but also helps the energy user.

Using this system, utilities are able to provide more energy during the high demand periods, without necessarily having to construct a higher capacity power generation facility, which would be more costly to do, to account for the higher demands. The energy that is produced can be stored in the pipeline at night, and transported to the end user via the pipeline, rather than a standard transmission line, and used during the day. This takes into consideration that the utility operates most effectively at constant load, while facing a constant demand power history. The problem the invention overcomes is that typical power plants face a diurnal variable demand power history, wherein the pneumatic transmission pipeline takes a variable diurnal demand power history and converts it to a constant demand power history. Conventional fuel combustion-driven turbine generator, geothermal and nuclear power plants prefer to operate at the same power level, day and night. Varying power level operation tends to fatigue the high speed rotational parts during their windup periods. The transfer line permits that these variations in power levels are eliminated. Also, utilities are able to produce energy at consistently high levels, and at constant power output levels, which maximizes the efficiency of the facility. Further, the utility is able to charge more for the energy used during the high demand periods, even though the energy is actually produced during the low demand, low cost, periods, i.e., nighttime power is sold at daytime rates.

From the standpoint of the user, the energy rates during the high demand periods can be made lower, and there are fewer risks associated with surges, spikes and outages occurring.

6. The Sixth Configuration:

In a sixth embodiment, one or more of the features described above in connection with the first five embodiments can be incorporated into a single system, and can be used to provide energy to multiple communities and facilities along the length of the pipeline. Each of the communities or facilities can tap into the main pipeline using a local branch pipeline connected thereto, i.e., for example, the main pipeline can be 100 miles long, and each branch can be 5 miles long. Each branch can also provide additional volume for compressed air energy storage.

As an example of a combination system, the pipeline can be located in a hot desert, and be used to service a facility that uses electricity and pneumatic equipment. In such case, the system is preferably installed without a heating element, or with the heating element turned off, so that the system can co-generate electricity and maximum chilled air at the same time. The system can also be set up so that some of the compressed air energy can drive the pneumatic equipment, thereby increasing the overall efficiencies of the system. Likewise, the system can be adapted so that compressed air energy can be generated by both a wind farm and a utility, to account for the uncertainties associated with using wind as a power source. It is sometimes advantageous to provide a secondary source of energy, such as a utility, or grid, which can be accessed when little or no wind is available.

Preferably, a series of servo check valves, gages and control logic are provided along the pipeline, so that the amount and rate at which the compressed air is stored and released at each end user station can be controlled and monitored. In this respect, to properly apportion the amount of energy being supplied using the present system, it is necessary to know how much compressed air energy is available, by determining how much pressure is actually in the pipeline at any given time, and then being able to release it at the appropriate rate.

The present invention preferably comprises sufficient storage capacity to enable sufficient power to be stored and released, even when the wind stops blowing for more than a week at a time. This is accomplished by anticipating the wind conditions and characteristics, and then using that data to effectively plan and develop a schedule, with the objective of enabling the system to compress the maximum amount of energy into storage when wind energy output levels are relatively high. By being able to store the compressed air energy, and releasing the energy at the appropriate time, in the manner described above, the present system is preferably able to effectively coordinate, manage and stabilize the delivery of energy in a manner that enables wind power fluctuations and oscillations to be reduced or avoided. This enables the system to stabilize and smooth the delivery of power, and avoid sudden surges and swings, which can adversely affect the power delivery system.

What is claimed is:

1. A method of storing and transporting compressed air energy, comprising:

using at least one power source and a compressor to produce compressed air energy at a first location;

storing the compressed air energy in a pipeline having a first segment followed substantially downstream by a second segment, wherein the internal diameter of said first segment is larger than that of said second segment;

substantially transporting the compressed air energy within said pipeline to a location remote from said first location;

releasing the compressed air energy from said first segment at a second location, wherein a generator is provided to generate electricity using the compressed air energy at said second location: and releasing the compressed air energy from said second segment to provide energy at a third location, wherein the compressed air energy within said second segment is used to 1) provide refrigeration and/or air conditioning at said third location, and/or 2) drive at least one pneumatic tool or equipment at said third location without having to convert the compressed air energy into electricity first.

2. The method of claim 1, wherein using at least one power source comprises using a power source selected from the group consisting of: 1) at least one wind turbine, 2) a wind farm, 3) a geothermal power plant, 4) a diesel power plant, 5) a nuclear power plant, and 6) a utility grid.

3. The method of claim 1, further comprising storing the compressed air energy within said pipeline during a time when energy at said first location is widely available or less expensive than at other times, and wherein the compressed air energy within said pipeline can be used at said second and third locations when energy demands are relatively high.

4. The method of claim 1, wherein storing and transporting the compressed air energy within said pipeline comprises maintaining the pressure within said first segment at or above 600 psia.

5. The method of claim 1, wherein said first segment of said pipeline is at least four feet in diameter and said second segment of said pipeline is at least three feet in diameter, wherein the pressure losses associated with friction within said pipeline is substantially less in said first segment than in said second segment.

6. The method of claim 1, wherein the method comprises providing at least one additional power source along said pipeline to generate additional compressed air energy to help reduce pressure losses that exist within said pipeline.

7. The method of claim 6, wherein said at least one additional power source comprises at least one wind turbine to generate and store compressed air energy in said pipeline.

8. The method of claim 1, wherein said first segment is located substantially between said first and second locations, and said second segment is located substantially between said second and third locations, or extended as a branch from said first segment downstream from said first location.

9. A method of storing and transporting compressed air energy, comprising:

using at least one power source and a compressor to produce compressed air energy at a first location;

storing the compressed air energy in a pipeline having a first segment followed substantially downstream by a second segment, wherein the internal diameter of said first segment is larger than that of said second segment;

substantially transporting the compressed air energy within said pipeline to a location remote from said first location;

releasing the compressed air energy from said first segment at a second location, wherein a generator is provided to generate electricity using the compressed air energy at said second location; and releasing the compressed air energy from said second segment to provide energy at a third location, wherein the compressed air energy within said second segment is used to drive equipment at said third location that requires less pressure to operate than said generator at said second location.

10. The method of claim 9, wherein the method comprises using the compressed air energy at said third location to provide refrigeration and/or air conditioning, and/or drive at least one pneumatic tool or equipment without having to convert the compressed air energy into electricity first.

11. The method of claim 9, wherein using at least one power source comprises using a power source selected from the group consisting of: 1) at least one wind turbine, 2) a wind farm, 3) a geothermal power plant, 4) a diesel power plant, 5) a nuclear power plant, and 6) a utility grid.

12. The method of claim 9, further comprising storing the compressed air energy within said pipeline during a time when energy at said first location is widely available or less expensive than at other times, and wherein the compressed air energy within said pipeline can be used at said second and third locations when energy demands are relatively high.

13. The method of claim 9, wherein storing and transporting the compressed air energy within said pipeline comprises maintaining the pressure within said first segment at or above 600 psia, and maintaining the pressure within said second segment at or above 200 psia.

14. The method of claim 9, wherein said first segment of said pipeline is at least four feet in diameter and said second segment of said pipeline is at least three feet in diameter, wherein the pressure losses associated with friction within said pipeline is substantially less in said first segment than in said second segment.

15. The method of claim 9, wherein the method comprises providing at least one additional power source along said pipeline to generate additional compressed air energy to help reduce pressure losses that exist within said pipeline.

16. The method of claim 9, wherein said first segment is located substantially between said first and second locations, and said second segment is located substantially between said second and third locations, or extended as a branch from said first segment downstream from said first location.

17. An apparatus for storing and transporting compressed air energy, comprising:

at least one power source and compressor to produce compressed air energy at a first location;

a pipeline having a first segment followed substantially downstream by a second segment, wherein the internal diameter of said first segment is larger than that of said second segment, wherein said pipeline is adapted to store the compressed air energy produced by said compressor within said pipeline and transport it to a location remote from said first location;

an expander and generator located at a second location for releasing the compressed air energy from said first segment and generating electricity using the compressed air energy within said pipeline; and an expander located at a third location for releasing the compressed air energy from said second segment and using the energy to drive equipment that requires less pressure to operate than said generator at said second location.

18. The apparatus of claim 17, wherein said equipment comprises at least one refrigeration and/or air conditioning device, and/or at least one pneumatic device which does not need to convert the compressed air energy into electricity first.

19. The apparatus of claim 17, wherein said at least one power source comprises a power source selected from the group consisting of: 1) at least one wind turbine, 2) a wind farm, 3) a geothermal power plant, 4) a diesel power plant, 5) a nuclear power plant, and 6) a utility grid.

20. The apparatus of claim 17, wherein the pressure of the compressed air energy within said first segment is maintained at or above 600 psia, and the pressure of the compressed air energy within said second segment is maintained at or above 200 psia.

21. The apparatus of claim 17, wherein said first segment of said pipeline is at least four feet in diameter and said second segment of said pipeline is at least three feet in diameter, wherein the pressure losses associated with friction within said pipeline is substantially less in said first segment than in said second segment.

22. The apparatus of claim 17, wherein at least one additional power source is provided along said pipeline to generate additional compressed air energy to help reduce pressure losses that exist within said pipeline.

23. The apparatus of claim 17, wherein said first segment is located substantially between said first and second locations, and said second segment is located substantially between said second and third locations, or extended as a branch from said first segment downstream from said first location.

* * * * *